(12) United States Patent
Archetti et al.

(10) Patent No.: US 10,301,545 B2
(45) Date of Patent: *May 28, 2019

(54) DEVICE CONTAINING A LIQUID-CRYSTALLINE MEDIUM

(71) Applicant: MERCK PATENT GMBH, Darmstadt (DE)

(72) Inventors: Graziano Archetti, Darmstadt (DE); Andreas Taugerbeck, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 85 days.

This patent is subject to a terminal disclaimer.

(21) Appl. No.: 14/784,722

(22) PCT Filed: Mar. 28, 2014

(86) PCT No.: PCT/EP2014/000842
§ 371 (c)(1),
(2) Date: Oct. 15, 2015

(87) PCT Pub. No.: WO2014/169988
PCT Pub. Date: Oct. 23, 2014

(65) Prior Publication Data
US 2016/0060530 A1    Mar. 3, 2016

(30) Foreign Application Priority Data
Apr. 16, 2013  (EP) ................... 13001968

(51) Int. Cl.
*G02F 1/23*   (2006.01)
*C09K 19/56*  (2006.01)
*C09K 19/54*  (2006.01)
*C09K 19/30*  (2006.01)
(Continued)

(52) U.S. Cl.
CPC .......... *C09K 19/56* (2013.01); *C09K 19/3003* (2013.01); *C09K 19/54* (2013.01);
(Continued)

(58) Field of Classification Search
CPC ....................................... C09K 19/56
See application file for complete search history.

(56) References Cited

U.S. PATENT DOCUMENTS

2009/0015902 A1   1/2009  McCarthy et al.
2009/0167971 A1   7/2009  Powers et al.
(Continued)

FOREIGN PATENT DOCUMENTS

DE    10 2011 108708 A1    3/2012
DE    WO 2012038026 A1 *   3/2012   ............. C09K 19/42
(Continued)

OTHER PUBLICATIONS

International Search Report dated Jun. 11, 2014 issued in corresponding PCT/EP2014/000842 application (pp. 1-3).
(Continued)

*Primary Examiner* — Chanceity N Robinson
(74) *Attorney, Agent, or Firm* — Millen White Zelano and Branigan, PC

(57) ABSTRACT

The present invention relates to a temperature-reactive device for the regulation of light transmission, containing a liquid-crystalline medium and a compound of formula I, capable of promoting or inducing homeotropic alignment to the adjacent liquid crystal medium at a given temperature. The invention furthermore relates to a process for the temperature-dependent control of light transmission through a layer of a liquid-crystalline medium.

20 Claims, 1 Drawing Sheet

(51) Int. Cl.
  *G02F 1/13* (2006.01)
  *C09K 19/04* (2006.01)
(52) U.S. Cl.
  CPC ...... *G02F 1/132* (2013.01); *C09K 2019/0444* (2013.01); *C09K 2019/301* (2013.01); *C09K 2019/3004* (2013.01); *C09K 2019/3009* (2013.01); *C09K 2019/3016* (2013.01); *C09K 2219/13* (2013.01)

(56) References Cited

U.S. PATENT DOCUMENTS

2011/0287196 A1  11/2011  Shaw et al.
2013/0037746 A1* 2/2013  Junge ............... C09K 19/007
                                           252/299.61
2013/0182202 A1* 7/2013  Graziano ........... C09K 19/42
                                           349/86

FOREIGN PATENT DOCUMENTS

DE  102012000065 A1 *  4/2012
DE  10 2012 000065 A1  8/2012
DE  WO 2012100901 A1 * 8/2012  ............ C09K 19/42
TW  201239458 A       10/2012
TW  201239458 A1 *    10/2012
WO  2012038026 A1     3/2012
WO  2013004372 A1     1/2013

OTHER PUBLICATIONS

Chinese Office Action for corresponding Patent Application No. 201480022604.4; dated Apr. 18, 2017.
English language Abstract for Taiwan Application No. 2012-39458; published Oct. 1, 2012.

* cited by examiner

DEVICE CONTAINING A LIQUID-CRYSTALLINE MEDIUM

The present invention relates to a temperature-reactive device for the regulation of light transmission, containing a liquid-crystalline medium and a compound of formula I, capable of promoting or inducing homeotropic alignment to the adjacent liquid crystal medium at a given temperature. The invention furthermore relates to a process for the temperature-dependent control of light transmission through a layer of a liquid-crystalline medium.

For the purposes of the present invention, the term "liquid-crystalline medium" is taken to mean a material, which exhibits liquid-crystalline properties under certain conditions. In particular, the term is taken to mean a material, which forms a nematic liquid-crystalline phase under certain conditions. A liquid-crystalline medium may comprise one or more liquid-crystalline compounds and in addition further substances.

The term "liquid-crystalline compound" is taken to mean a compound, which exhibits liquid-crystalline properties under certain conditions, and in particular a compound, that forms a nematic liquid-crystalline phase under certain conditions, or that forms a nematic liquid-crystalline phase upon mixing with other liquid-crystalline compounds.

For the purposes of the present application, a "temperature-reactive device" is taken to mean a device, which adopts various states depending on the temperature. An example thereof is a device, which exhibits a varying degree of light transmission depending on the temperature.

The term "alignment" or "orientation" relates to alignment (orientation ordering) of anisotropic units of material such as small molecules or fragments of big molecules in a common direction named "alignment direction". In an aligned layer of liquid-crystalline material the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a large proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a large proportion of the liquid-crystalline molecules are oriented at an angle θ ("tilt angle") between about 80° to 90° relative to the plane of the layer.

Furthermore, the definitions as given in C. Tschierske, G. Pelzl and S. Diele, Angew. Chem. 2004, 116, 6340-6368 shall apply to non-defined terms related to liquid crystal materials in the instant application.

For the purposes of the present application, the term light transmission is taken to mean the passage of electromagnetic radiation in the visible (VIS), near infrared (near-IR, NIR) and UV-A region through the device. The term light in the present application is correspondingly likewise taken to mean electromagnetic radiation in the visible, near infrared and UV-A region of the spectrum. In accordance with physical definitions usually used, UV-A light, visible light and near infrared light together are taken to mean radiation having a wavelength of 320 to 3000 nm.

With the increasing importance of energy efficiency of buildings, there is a growing demand for devices, which control the transmission of light and thus the energy flow through windows or glass surfaces. In particular, there is a demand for devices which are able to adapt the energy flow through glass surfaces to the conditions (heat, cold, high insolation, low insolation) prevailing at the particular point in time. Of particular interest is the provision of such devices in temperate climatic zones, where a seasonal change takes place from warm outside temperatures combined with high insolation to cold outside temperatures combined with low insolation.

The effects caused by insulation on glass surfaces in buildings will be presented below. Comparable effects may occur not only in the case of buildings, but also in the case of vehicles or transport containers, for example shipping containers.

In warm climatic zones and in temperature climatic zones in the warm season, glass surfaces in buildings result in undesired heating of the interior when they are affected by insolation. This is because glass is transparent to radiation in the VIS or near-IR region of the electromagnetic spectrum. Objects in the interior absorb the radiation that has been allowed through and are warmed thereby, which results in an increase in the room temperature (greenhouse effect). However, the said effect of glass surfaces in buildings is not generally undesired: in the case of low outside temperatures, in particular in cold climatic zones or in the cold season in temperate climatic zones, heating of the interior due to insolation as a consequence of this effect may be advantageous, since the energy demand for space heating is thereby reduced and costs can thus be saved.

One of the main technical objects of the present invention is to provide devices which regulate light transmission through windows or other glass surfaces, preferably, to provide devices which adapt the regulation of light transmission automatically to the prevailing conditions, as explained above (smart windows), more preferably, to provide devices which work energy-efficiently, can be installed with the lowest possible technical effort, are technically reliable and meet aesthetic demands. Examples of the latter aspect, which may be mentioned, are highly regular switching of the device and avoidance of colour or pattern effects.

The prior art discloses devices which can be switched reversibly from a transparent state to a less light-transparent state, for example an opaque (light-scattering) or dark-transparent state, on application of an electrical voltage (for example C. M. Lampert et al., Solar Energy Materials & Solar Cells, 2003, 489-499).

However, electrically switchable devices like the devices mentioned above have the disadvantage that they cannot be adapted immediately and automatically to the ambient conditions. Furthermore, they require electrical connections, which is associated with increased effort during installation and an increased need for maintenance.

US 2009/0015902 and US 2009/0167971 disclose temperature-reactive devices, which contain a liquid-crystalline medium in a layer between two polarisers. The switching between a state of relatively high light transmission and a state of relatively low light transmission is achieved by a phase transition of the liquid-crystalline medium from a nematic state to an isotropic state. Due to the phase transition, an abrupt transition occurs here between the state of high light transmission and the state of relatively low light transmission. It may occur here that the state of high light transmission exists over the entire surface of the device, considered in a few areas, while the state of low light transmission exists at the same time in other, adjacent areas.

WO 2012/100901 A1 discloses a temperature-reactive device for the regulation of light transmission, containing a liquid-crystalline medium and a component (N) comprising silsesquioxanes, which promotes or induces vertical alignment with respect to substrate main plane. The invention also relates to a process for the temperature-dependent control of light transmission through a layer of a liquid-crystalline medium. However, the use of the organic compounds of formula I according to the present invention, in order to promote such homeotropic alignment is neither disclosed nor suggested.

WO 2011/004340 A1 discloses a liquid-crystalline media (LC media) having negative or positive dielectric anisotropy comprising self-aligning mesogens, which effect homeotropic (vertical) alignment of the LC media at a surface or the cell walls of a liquid-crystal display (LC display). The invention therefore also encompasses LC displays having homeotropic alignment of the liquid-crystalline medium (LC medium) without conventional imide alignment layers.

However, it can be summarized that there is a considerable demand for temperature-reactive devices suitable for the regulation of light transmission through windows or generally light-transparent surfaces. In particular, there is a demand for devices in which the switching process is based on alternative principles. In particular again, there is a demand for devices in which the switching process does not proceed abruptly, but instead gradually via intermediate values of the transmission.

In addition, modern temperature-reactive devices have to fulfil a number of requirements, which are amongst others,
- a high efficiency over a prolonged period of use,
- a high stability against solar irradiation, especially UV radiation,
- a favourable adaption of the energy flow through glass surfaces to the ambient temperature conditions,
- a high durability in an environment where it is externally exposed especially regarding cold and heat,
- the method of production has to be cost efficient and suitable for a mass production process.

In view of the prior art and all above-mentioned requirements on such materials, there is a considerable demand for new or alternative devices, which preferably do not show the drawbacks of the temperature reactive devices of prior art or even if do so, preferably to a less extent.

Surprisingly, the inventors have found that temperature-reactive devices, which comprise a layer of a liquid-crystalline medium, characterized in that the liquid-crystalline medium comprises at least one liquid-crystalline compound and at least one compound of formula I, represent excellent alternatives to already known temperature reactive devices of prior art, and preferably, improve one or more of the above-mentioned requirements in view of the prior art, or more preferably, fulfil all above-mentioned requirements at the same time.

Accordingly, the present invention relates to a temperature-reactive device suitable for the regulation of light transmission, comprising a layer of a liquid-crystalline medium, characterized in that the liquid-crystalline medium comprises at least one liquid-crystalline compound and at least one compound of formula I, $$R^{11}\text{-}A^{11}\text{-}(Z^{12}\text{-}A^{12})_m\text{-}AG \qquad I,$$

in which,
$A^{11}$ and $A^{12}$ each, independently of one another, denote an aryl-, heteroaryl-, heterocyclic- or alicyclic group optionally being substituted by one or more identical or different groups L, L in each case, independently of one another, denotes, halogen, —CN, —NO$_2$, —NCO, —NCS, —OCN, —SCN, straight-chain or branched alkyl or alkoxy having 1 to 5 C atoms, where, in addition, one or more non-terminal CH$_2$ groups in these radicals may each be replaced, independently of one another, by —C≡C—, —CF$_2$O—, —CH=CH—,

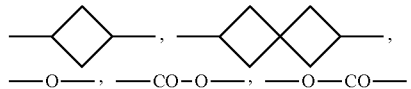

in such a way that O atoms are not linked directly to one another, and in which, in addition, one or more H atoms may be replaced by halogen, $Z_{12}$ in each case, independently of one another, denotes —O—, —S—, —CO—, —COO—, —OCO—, —S—CO—, —CO—S—, —O—OCO—, —CO—NR$^0$—, —NR$^0$—CO—, —NR$^0$—CO—NR$^{00}$, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^{01}$=CY$^{02}$—, —C≡C—, —CH=CH—COO—, —OCO—CH=CH—, or a single bond, preferably —COO—, —OCO—, —CO—O—, —O—CO—, —OCH$_2$—, —CH$_2$O—, -, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond, $Y^{01}$ and $Y^{02}$ each, independently of one another, denote H, F, Cl or CN.

$R^0$ and $R^{00}$ each, independently of one another, denote H or alkyl having 1 to 12 C atoms, $R^{11}$ denotes an alkyl or alkoxy radical having 1 to 15 C atoms, where, in addition, one or more non-terminal CH$_2$ groups in these radicals may each be replaced, independently of one another, by —C≡C—, —CF$_2$O—, —CH=CH—,

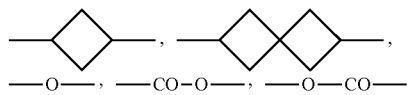

in such a way that O atoms are not linked directly to one another, and in which, in addition, one or more H atoms may be replaced by halogen, AG denotes -Sp-X$^{11}$ Sp denotes —(CH$_2$)$_p$—, p denotes 0, 1 or 2, X$_{11}$ denotes a group —NH$_2$, —SH, —OH, —(CO)OH or a group of the formulae

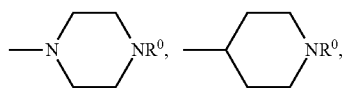

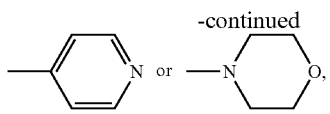

and m denotes 0, 1 or 2.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1'']terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, more preferably 1,4-phenylene, 4,4'-biphenylene, 1,4-tephenylene.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and that are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl, more preferably 1,4-cyclohexylene 4,4'-bicyclohexylene, 3,17-hexadecahydro-cyclopenta[a]phenanthrene, optionally being substituted by one or more identical or different groups L, Especially preferred aryl-, heteroaryl-, alicyclic- and heterocyclic groups are 1,4-phenylene, 4,4'-biphenylene, 1,4-terphenylene, 1,4-cyclohexylene, 4,4'-bicyclohexylene, and 3,17-hexadecahydro-cyclopenta[a]phenanthrene, optionally being substituted by one or more identical or different groups L.

Preferred substituents of the above-mentioned aryl-, heteroaryl-, alicyclic- and heterocyclic groups are, for example, solubility-promoting groups, such as alkyl or alkoxy and electron-withdrawing groups, such as fluorine, nitro or nitrile.

Particularly preferred substituents are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$.

Above and below "halogen" denotes F, Cl, Br or I.

Above and below, the terms "alkyl", "aryl", "heteroaryl", etc., also encompass polyvalent groups, for example alkylene, arylene, heteroarylene, etc. The term "aryl" denotes an aromatic carbon group or a group derived there from. The term "heteroaryl" denotes "aryl" in accordance with the above definition containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl.

Preferred alkynyl groups are, for example, ethynyl, propynyl, butynyl, pentynyl, hexynyl, octynyl.

Preferred amino groups are, for example, dimethylamino, methylamino, methylphenylamino, phenylamino.

In another preferred embodiment of the present invention, the compounds of formula I are selected from the group of compounds wherein the anchor group AG in formula I denotes —$NH_2$, —SH, —OH or —(CO)OH.

More preferably, the compounds of formula I are selected from the group of compounds of the following formulae,

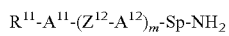 Ia

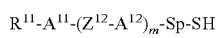 Ib

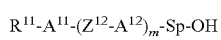 Ic

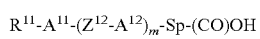 Id in which, the groups $R^{11}$, $A^{11}$, $A^{12}$, $Z^{12}$, Sp and parameter m have one of the meanings as indicated under formula I.

Even more preferred are the compounds of formula I selected from the group of compounds in which m denotes 0.

Accordingly, preferred compounds are the compounds of formula I selected from formulae Ia and Ic, such as

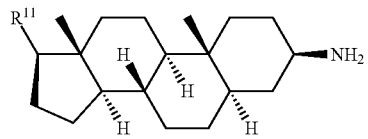 Ia-1

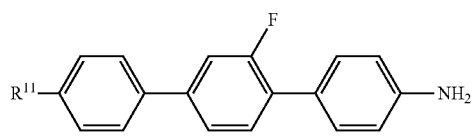 Ia-2

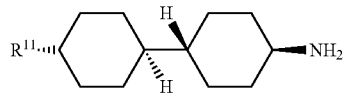 Ia-3

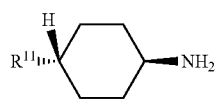 Ia-4

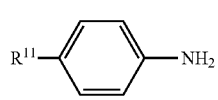 Ia-5

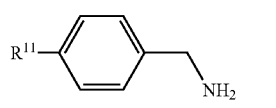 Ia-6

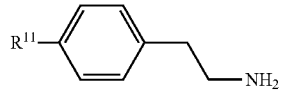 Ia-7

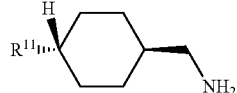 Ia-8

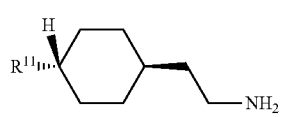 Ia-9

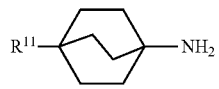 Ia-10

-continued

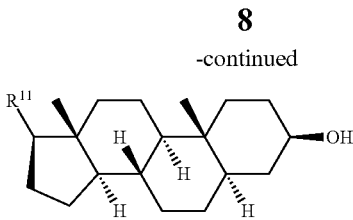 Ic-1

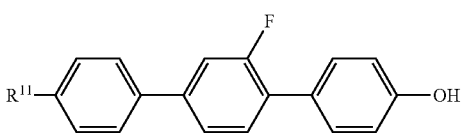 Ic-2

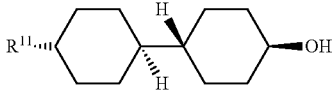 Ic-3

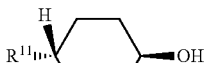 Ic-4

 Ic-5

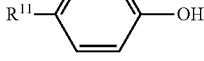 Ic-6

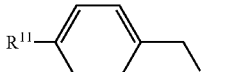 Ic-7

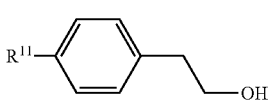 Ic-8

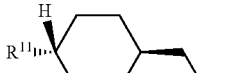 Ic-9

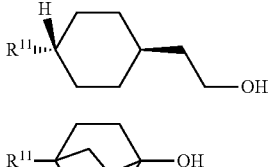 Ic-10 in which $R^{11}$ is a straight chain or branched alkyl, having 1 to 25 C atoms.

Especially preferred are the compounds wherein no group Sp is present, such as the compounds of formulae Ia-1 to Ia-5, Ia-10, Ic-1 to Ic-5 and Ic-10, and in particular the compounds of formula Ic-4 and Ic-5.

Typically, the total concentration of compounds of formula I range from approximately 0.01 to approximately 10% by weight, preferably from approximately 0.01 to approximately 5% by weight, and more preferably from approximately 0.01 to approximately 3% by weight.

In a preferred embodiment of the invention, the layer of the liquid-crystalline medium is arranged between two substrate layers.

In accordance with the invention, the two substrate layers may consist, inter alia, each and independently from another of a polymeric material, of metal oxide, for example ITO, of glass and/or of metal, preferably each and independently of another of glass and/or ITO, in particular glass/glass, glass/ITO or ITO/ITO.

In a preferred embodiment, the substrates are arranged with a separation of at least 1 µM from one another, preferably at least 2 µm from another, and more preferably at least 3 µm from another, where the layer of the liquid-crystalline medium is located in the interspace. The substrate layers can be kept at a defined separation from one another by, for example, spacers, or projecting structures in the layer. Typical spacer materials are commonly known to the expert, as for example spacers made of plastic, silica, epoxy resins, etc.

In accordance with the present invention, the device comprises no alignment layers adjacent to the layer of the liquid-crystalline medium.

In a preferred embodiment of the invention, the device has two or more polarisers, at least one of which is arranged on one side of the layer of the liquid-crystalline medium and at least one of which is arranged on the opposite side of the layer of the liquid-crystalline medium. The layer of the liquid-crystalline medium and the polarisers here are preferably arranged parallel to one another.

The polarisers can be linear polarisers or circular polarisers. Preferably, precisely two polarisers are present in the device. In this case, it is furthermore preferred for the polarisers either both to be linear polarisers or both to be circular polarisers. In accordance with a possible embodiment of the invention, however, a linear polariser can also be used together with a circular polariser.

If two linear polarisers are present in the device, it is preferred in accordance with the invention for the polarisation directions of the two polarisers to be the same or to be rotated merely by a small angle to one another.

It is furthermore preferred in the case where two circular polarisers are present in the device for these to have the same polarisation direction, i.e. either both are right-hand circular-polarised or both are left-hand circular-polarised.

The polarisers can be reflective or absorptive polarisers. A reflective polariser in the sense of the present application reflects light having one polarisation direction or one type of circular-polarised light, while being transparent to light having the other polarisation direction or the other type of circular-polarised light. Correspondingly, an absorptive polariser absorbs light having one polarisation direction or one type of circular-polarised light, while being transparent to light having the other polarisation direction or the other type of circular-polarised light. The reflection or absorption is usually not quantitative, meaning that complete polarisation of the light passing through the polariser does not take place.

For the purposes of the present invention, both absorptive and reflective polarisers can be employed. Preference is given to the use of polarisers, which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. No. 7,038,745 and U.S. Pat. No. 6,099,758) and APF (advanced polariser film, 3M). Furthermore, it is possible to employ polarisers based on wire grids (WGPs, wire-grid polarisers) which reflect infrared light. Examples of absorptive polarisers, which can be employed in the devices according to the invention, are the Itos XP38 polariser film and the Nitto Denko GU-1220DUN polariser film. An example of a circular polariser, which can be used in accordance with the invention, is the APNCP37-035-STD polariser (American Polarizers). A further example is the CP42 polariser (ITOS).

In another embodiment according to the invention, the polarisers represent the substrate layers between which the liquid-crystalline medium is arranged, i.e. no additional substrate layers are present in the device.

In a further preferred embodiment of the invention, the layer of the liquid-crystalline medium is located between two flexible layers, for example flexible polymer films. The device according to the invention is consequently flexible and bendable and can be rolled up, for example. The flexible layers can represent the substrate layer, the alignment layer, and/or polarisers. Further layers, which are preferable flexible, may also, be present. For a more detailed disclosure of the preferred embodiments, in which the layer of the liquid-crystalline medium is located between flexible layers, reference is given to the application US 2010/0045924.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

In a further preferred embodiment of the invention, the liquid-crystalline medium has a solid or gelatinous consistency. The term "gelatinous" refers to a consistency having the nature of or resembling jelly. The device according to the invention is consequently less susceptible to damage. If, furthermore, exclusively flexible, bendable and cuttable layers are present in addition to the layer of the liquid-crystalline medium, the device can not only be rolled up, but pieces of an area required in each case can also be cut out.

The device may furthermore comprise filters which block light of certain wavelengths, for example UV filters. In accordance with the invention, further functional layers, such as, for example, protective films, heat-insulation films or metal-oxide layers, may also be present.

Furthermore, electrodes and further electrical components and connections may be present in the device according to the invention in order to facilitate electrical switching of the device, comparable to the switching of an LC display. In a preferred embodiment of the invention, however, electrodes and further electrical components and connections are not present.

Furthermore, it is generally preferred on use of the device for the switching to be effected by a temperature change (and not by the application of an electric field). Preferred temperature ranges of the switching operation are indicated in following sections.

The liquid-crystalline medium in accordance with the present invention comprises one or more, preferably at least 3, particularly preferably at least 4 and very particularly preferably at least 5, different liquid-crystalline compounds. If only one liquid crystalline compound is employed, a typical concentration ranges from about 80 to 99% by weight of the total mixture.

The liquid-crystalline medium in accordance with the present invention optionally comprises further compounds, for example stabilisers and/or chiral dopants. Compounds of this type are known to the person skilled in the art. They are preferably employed in a concentration of 0% to 30%, particularly preferably 0.1% to 20%, and very particularly preferably 0.1% to 10%.

In accordance with the invention, the liquid-crystalline medium can have positive dielectric anisotropy $\Delta\varepsilon$. In this case, $\Delta\varepsilon$ preferably has a value of $\geq 1.5$.

In accordance with the invention, the liquid-crystalline medium can have negative dielectric anisotropy $\Delta\varepsilon$. In this case, $\Delta\varepsilon$ preferably has a value of $\leq -1.5$.

In accordance with the invention, the liquid-crystalline medium can furthermore have a low positive or negative dielectric anisotropy $\Delta\varepsilon$. In this case, the following preferably applies to $\Delta\varepsilon$: $-1.5<\Delta\varepsilon<1.5$. The present invention likewise relates to a liquid-crystalline medium of this type. In this case, the following particularly preferably applies: $-1.0<\Delta\varepsilon<1.0$.

$\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\parallel - \varepsilon_\perp)$, while $\varepsilon_{ave.}$ is $(\varepsilon_\parallel + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

The liquid-crystalline medium preferably has a nematic phase in a temperature range from 0° C. to 50° C. The liquid-crystalline medium particularly preferably has a nematic phase in the range from −20° C. to 80° C., even more preferably in the range from −40° C. to 100° C.

In accordance with the invention, the liquid-crystalline medium can comprise any desired liquid-crystalline compounds, with the proviso that compounds of formula I are excluded.

The liquid-crystalline medium preferably comprises at least one or more compounds of formula II, which is mandatorily different from the compounds of formula I,

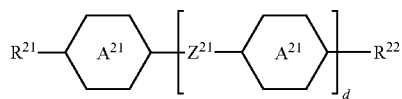

II where
$R^{21}$, $R^{22}$ on each occurrence, identically or differently, represent F, Cl, —CN, —NCS, —SCN, $R^{23}$—O—CO—, $R^{23}$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more non terminal $CH_2$ groups may be replaced by O or S; and $R^{23}$ on each occurrence, identically or differently, represents an alkyl group having 1 to 10 C atoms, in which one or more hydrogen atoms may be replaced by F or Cl, and in which one or more non terminal $CH_2$ groups may be replaced by O or S; and

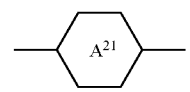

is selected on each occurrence, identically or differently, from

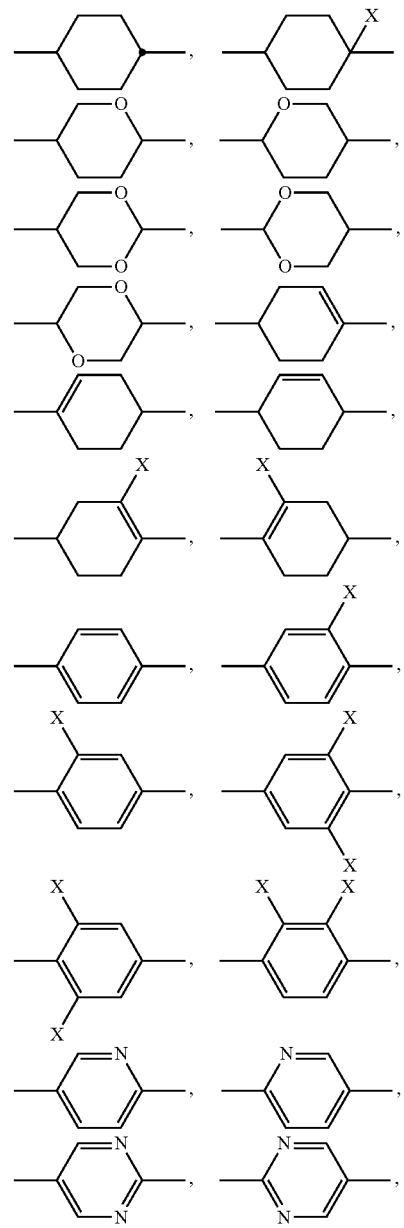

-continued

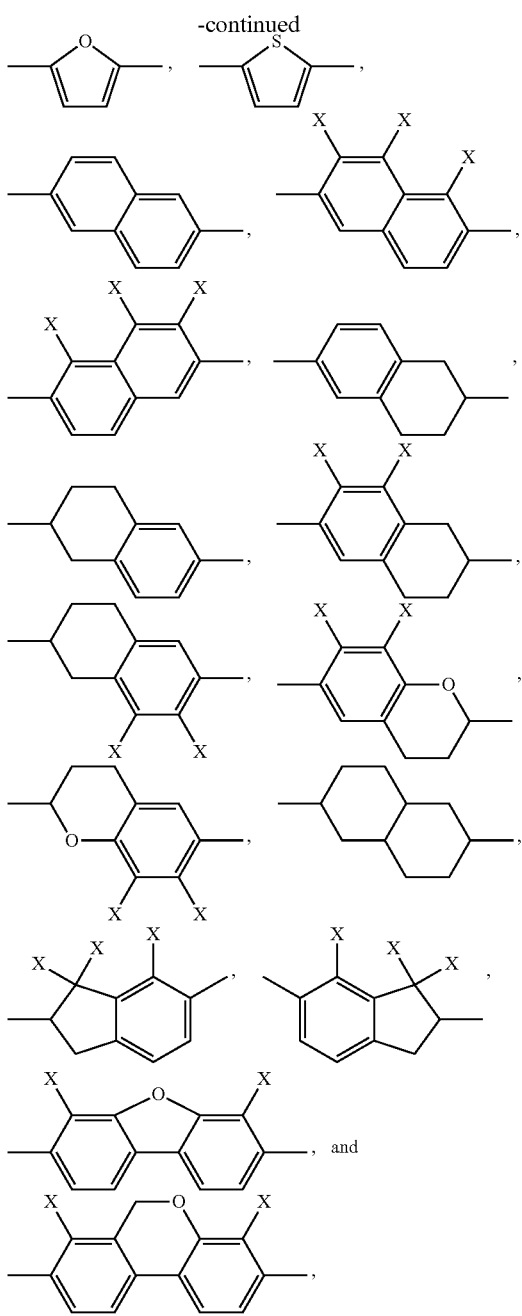

where

X is selected on each occurrence, identically or differently, from F, Cl, CN or an alkyl, alkoxy or alkylthio group having 1 to 10 C atoms, where one or more hydrogen atoms in the above-mentioned groups may be replaced by F or Cl, and where one or more CH$_2$ groups in the above-mentioned groups may be replaced by O or S; and Z$_{21}$ is selected on each occurrence, identically or differently, from —CO—O—, —O—CO—, —CF$_2$—CF$_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$—, —CH$_2$O— and a single bond; and d adopts a value of 0, 1, 2, 3, 4, 5 or 6, preferably 0, 1, 2 or 3, particularly preferably 1, 2 or 3.

For clarity, it should be noted that groups

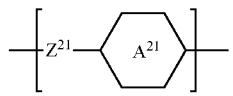

may be identical or different on each occurrence.

Particularly preferred embodiments of the liquid-crystalline compounds for the use in the device according to the invention conform to the formulae disclosed in Tables A and B below.

In a further preferred embodiment, the device comprises a liquid crystalline medium comprising,
  a mixture compounds of formula II, preferably selected from compounds disclosed in Tables A and B, comprising,
    1 to 40%, preferably 5 to 20% of compounds of formula CY-n-(O)m, and/or
    1 to 40%, preferably 10 to 30% of compounds of formula CCY-n-(O)m, and/or
    1 to 40%, preferably 10 to 30% of compounds of formula CPY-n-(O)m, and/or
    1 to 50%, preferably 20 to 40% of compounds of formula CCH-n-m, and/or
    1 to 30%, preferably 5 to 20% of compounds of formula PCH-n-m,
    more preferably all above-mentioned compounds at the same time,
  and
    0.01 to 10% of at least one compound of formula I, preferably selected from the group of compounds of formula Ic-4 or Ic-5,
  however, in a total amount 100%.

In another preferred embodiment, the device comprises a liquid crystalline medium comprising,
  a mixture of compounds of formula II, preferably selected from compounds disclosed in Tables A and B, comprising,
    1 to 40%, preferably 5 to 30% of compounds of formula CC-n(V)-(O)m, and/or
    1 to 20%, preferably 5 to 15% of compounds of formula PGU-n-F, and/or
    1 to 40%, preferably 10 to 30% of compounds of formula ACQU-n-F, and/or
    1 to 30%, preferably 5 to 20% of compounds of formula PUQU-n-F, and/or
    1 to 30%, preferably 5 to 20% of compounds of formula CCP-n-m, and/or
    1 to 25%, preferably 5 to 15% of compounds of formula APUQU-n-F, and/or
    1 to 25%, preferably 5 to 20% of compounds of formula APUQU-n-F, and/or
    1 to 25%, preferably 3 to 15% of compounds of formula PGUQU-n-F, and/or
    1 to 25%, preferably 5 to 20% of compounds of formula CPGU-n-OT,
    more preferably all above-mentioned compounds at the same time,
  and
    0.01 to 10% of at least one compound of formula I, preferably selected from the group of compounds of formula Ic-4 or Ic-5,
  however, in a total amount 100%.

The way in which the devices according to the invention are produced is known to the person skilled in the art in the area of devices containing liquid-crystalline media.

A suitable process for the production of the device according to the invention comprises at least a step of providing a layer of the liquid-crystalline medium, comprising at least one liquid-crystalline compound of formula II and at least one compound of formula I, onto a substrate. The application in a layer is preferably carried out between two substrate layers. Alternative methods such as flow-filling, printing, etc., which are commonly known by the expert, are also in accordance with the present invention It may be necessary in accordance with the invention to carry out a heating and/or cooling step in order to obtain an initial homeotropic alignment of the liquid-crystalline compounds.

For the preparation of the liquid-crystalline medium, one or more compounds of formula I are dissolved or dispersed in the liquid-crystalline compound or the mixture comprising the liquid-crystalline compound.

The functional principle of the device according to the invention will be explained in detail below. It is noted that no restriction of the scope of the claimed invention, which is not present in the claims, is to be derived from the comments on the assumed way of functioning.

The light transmission of the device according to the invention is dependent on the temperature. In a preferred embodiment, the light transmission of the device is high at low temperature and low at high temperature.

In a preferred embodiment, the device according to the invention has a boundary state A and a boundary state B. For the purposes of the present application, the term boundary state is taken to mean a state in which the transmission reaches a maximum or minimum value and changes no further or virtually no further on a further reduction or increase in the temperature. However, this does not exclude a further change in the transmission taking place in the case of a considerable reduction or increase in the temperature beyond the temperature of the boundary state.

The device preferably has a boundary state A with a transmission $T_A$ at a temperature below a boundary temperature $\theta_A$, and a boundary state B with a transmission $T_B$ at a temperature above a boundary temperature $\theta_B$, where:

$\theta_A < \theta_B$ and $T_A > T_B$.

$\theta_A$ is preferably between −15 and +25° C., particularly preferably between −5 and +10° C.

$\theta_B$ is preferably between +60 and +100° C., particularly preferably between +70 and +90° C.

The temperature span between the two boundary temperatures $\theta_A$ and $\theta_B$ represents the range in which the device reacts to temperature changes with a change in transmission (working range or switching range of the device). The device is preferably used at temperatures within this range. However, it can also be used at temperatures outside this range, preferably at temperatures below $\theta_A$.

In accordance with the invention, the working range of the device can be set and changed by varying the concentration of compounds of formula I and/or the composition of the liquid-crystalline mixture. In accordance with the invention, the working range of the device can furthermore be set and changed by varying the substrate material.

The switching range of the device is preferably at room temperature and above. Particularly preferred values for the span between the boundary temperatures $\theta_A$ and $\theta_B$, and thus for the switching range of the device, are:
0° C. to 100° C.;
more preferably 5° C. to 80° C.;
even more preferably 20° C. to 60° C.

In accordance with the invention, the transition between the two boundary states A and B with increasing temperature and the transition between the two boundary states B and A with decreasing temperature proceeds gradually via intermediate values of the transmission T. Preferably, the intermediate values of T are not necessarily equal upon cooling and heating.

In accordance with the present invention, a large proportion of the liquid-crystalline compounds are aligned vertically to the substrate surface at low temperature (homeotropic alignment). With increasing temperature, the proportion of vertically aligned compounds decreases. From a certain temperature, whose value depends on the compounds of formula I used and the composition of the liquid-crystalline medium and the type of substrate material, the compounds are aligned planar to the substrate surface. The liquid-crystalline compounds in state A of the switching element are preferably predominantly homeotropically aligned, and in state B of the switching element are preferably predominantly aligned in a planar arrangement.

The change from homeotropic to planar alignment of the liquid-crystalline compounds can be used in order to achieve a temperature-dependent change in the transmission of the device.

The present invention thus also relates to a process for the temperature-dependent control of the light transmission through a device comprising a layer of a liquid-crystalline medium comprising at least one liquid-crystalline compound and at least one compound of formula I, characterized in that at least the liquid-crystalline compounds of the liquid-crystalline medium change from a homeotropic alignment to a planar alignment as a function of the temperature.

In this process, a polariser is preferably present on one side of the layer of the liquid-crystalline medium layer and on the opposite side of the liquid-crystalline medium. Preferred embodiments of polarisers were described in the preceding section.

Using an example, it will be illustrated how a process of this type can be carried out. At the same time, the example also shows a preferred embodiment of the device according to the invention. In this example, a linear polariser is present on one side of the layer of the liquid-crystalline medium. A further linear polariser whose plane of polarisation is aligned in the same way as the plane of polarisation of the first linear polariser is present on the opposite side of the layer of the liquid-crystalline medium. In the case of homeotropic alignment of the liquid-crystalline compounds in the layer of the liquid-crystalline medium, the light passing through the first polariser thus also passes through the second polariser. This corresponds to boundary state A with high transmission $T_A$, as defined above. In the case of planar alignment of the liquid-crystalline compounds in the layer of the liquid-crystalline medium, however, the polarisation properties of the light passing through the first polariser are changed on passing through the layer of the liquid-crystalline medium. This results in the light being partially or completely blocked by the second polariser, i.e. being absorbed or reflected. This state corresponds to boundary state B with low transmission $T_B$, as defined above. At intermediate values of the temperature between the temperatures of boundary states A and B, transmission values are achieved which are between the transmission values in boundary states A and B.

The device in accordance with the present invention can be installed on windows, facades, doors, or roofs.

The invention thus also relates to the use of the device according to the invention for the regulation of light entry and/or energy input into an interior.

The invention furthermore relates to the use of a device as described above and below comprising a layer of a liquid-crystalline medium comprising at least one liquid-crystalline compound and at least one compound of formula I, for the temperature-dependent regulation of light transmission from the environment into an enclosed space.

As mentioned above, the invention is not restricted to buildings, but can also be used in transport containers, for example shipping containers, or vehicles. It is particularly preferred to install the device on glass panes of windows or to use it as a component of multipane insulating glass. The device according to the invention can be installed on the outside, the inside or, in the case of multipane glass, in the cavity between two glass panes, where the inside is taken to mean the side of a glass surface, which faces the interior. Preference is given to use on the inside or in the cavity between two glass panes in the case of multipane insulating glass.

The device according to the invention may completely cover the respective glass surface on which it is installed or only partly cover it. In the case of complete coverage, the influence on light transmission through the glass surface is at its maximum. In the case of partial coverage, by contrast, a certain amount of light is transmitted by the glass surface through the uncovered parts, even in the state of the device with low transmission. Partial coverage can be achieved, for example, by installing the devices on the glass surface in the form of strips or certain patterns.

In a preferred embodiment of the invention, the device regulates light transmission through the glass surface into the interior automatically, solely owing to its temperature reactivity. Manual regulation is not necessary here.

According to this preferred embodiment, the device does not comprise any electrodes or other electronic components with which electrical switching of the device could take place.

In an alternative embodiment of the invention, the device also has electrical switchability in addition to its temperature switchability. In particular, electrodes are present in the device in this case, and the liquid-crystalline medium has positive or negative dielectric anisotropy $\Delta\in$. It is preferred here for $\Delta\in$ to be $\geq 1.5$ or for $\Delta\in$ to be $\leq -1.5$. In this embodiment of the invention, manual, electrically promoted switching of the device from high transmission to low transmission and vice versa is possible. The way in which such electrical switching of a liquid-crystalline medium from a homeotropic state into another state can be achieved is known to the person skilled in the art in the area of devices containing liquid-crystalline media.

The parameter ranges indicated in this application all include the limit values including the maximum permissible errors as known by the expert. The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta$n) is determined at a wavelength of 589.3 nm. The dielectric anisotropy ($\Delta\in$) is determined at a frequency of 1 kHz or if explicitly stated at a frequency 19 GHz. The threshold voltages, as well as all other electro-optical properties, are determined using test cells produced at Merck KGaA, Germany. The test cells for the determination of $\Delta\in$ have a cell thickness of approximately 20 µm. The electrode is a circular ITO electrode having an area of 1.13 cm$^2$ and a guard ring. The orientation layers are SE-1211 from Nissan Chemicals, Japan, for homeotropic orientation ($\in_\parallel$) and polyimide AL-1054 from Japan Synthetic Rubber, Japan, for homogeneous orientation ($\in_\perp$). The capacitances are determined using a Solatron 1260 frequency response analyser using a sine wave with a voltage of 0.3 V$_{rms}$. The light used in the electro-optical measurements is white light. A set-up using a commercially available DMS instrument from Autronic-Melchers, Germany, is used here.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is only one example of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to, or alternative to any invention presently claimed.

Preferred liquid-crystalline compounds in accordance with the present invention are shown in Tables A and B below.

The structures of the liquid-crystalline compounds are indicated below by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, z and k are integers and preferably denote 1, 2, 3, 4, 5, 6, 7, 8, 9, 10, 11 or 12.

Table A only shows the acronym for the parent structure. In individual cases, the acronym for the parent structure is followed, separated by a dash, by a code for the substituents R$^{1*}$, R$^{2*}$, L$^{1*}$ and L$^{2*}$:

| Code for R$^{1*}$, R$^{2*}$, L$^{1*}$, L$^{2*}$ | R$^{1*}$ | R$^{2*}$ | L$^{1*}$ | L$^{2*}$ |
|---|---|---|---|---|
| nm | C$_n$H$_{2n+1}$ | C$_m$H$_{2m+1}$ | H | H |
| nOm | C$_n$H$_{2n+1}$ | OC$_m$H$_{2m+1}$ | H | H |
| nO.m | OC$_n$H$_{2n+1}$ | C$_m$H$_{2m+1}$ | H | H |
| n | C$_n$H$_{2n+1}$ | CN | H | H |
| nN.F | C$_n$H$_{2n+1}$ | CN | F | H |
| nN.F.F | C$_n$H$_{2n+1}$ | CN | F | F |
| nF | C$_n$H$_{2n+1}$ | F | H | H |
| nCl | C$_n$H$_{2n+1}$ | Cl | H | H |
| nOF | OC$_n$H$_{2n+1}$ | F | H | H |

-continued

| Code for R$^{1*}$, R$^{2*}$, L$^{1*}$, L$^{2*}$ | R$^{1*}$ | R$^{2*}$ | L$^{1*}$ | L$^{2*}$ |
|---|---|---|---|---|
| nF.F | C$_n$H$_{2n+1}$ | F | F | H |
| nF.F.F | C$_n$H$_{2n+1}$ | F | F | F |
| nOCF$_3$ | C$_n$H$_{2n+1}$ | OCF$_3$ | H | H |
| nOCF$_3$.F | C$_n$H$_{2n+1}$ | OCF$_3$ | F | H |
| n-Vm | C$_n$H$_{2n+1}$ | —CH=CH—C$_m$H$_{2m+1}$ | H | H |
| nV-Vm | C$_n$H$_{2n+1}$—CH=CH— | —CH=CH—C$_m$H$_{2m+1}$ | H | H |

TABLE A

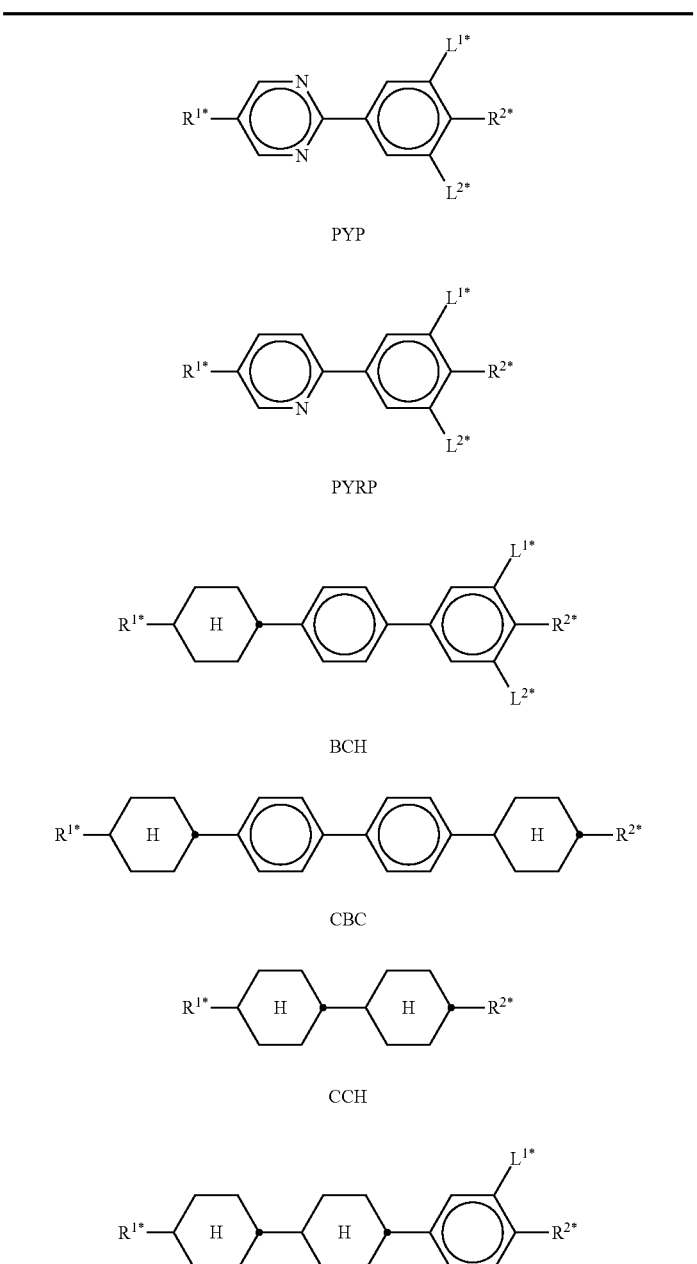

TABLE A-continued
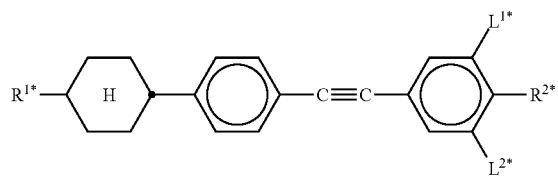
CPTP
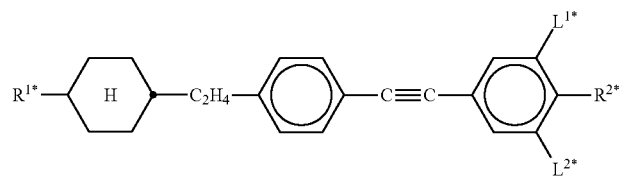
CEPTP
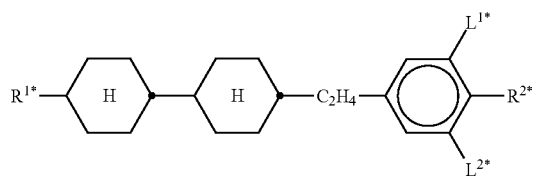
ECCP
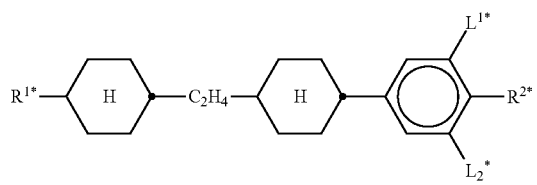
CECP
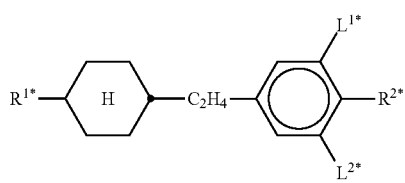
EPCH
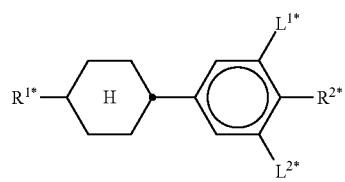
PCH
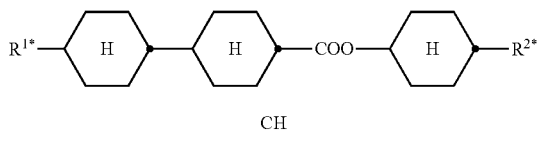
CH TABLE A-continued
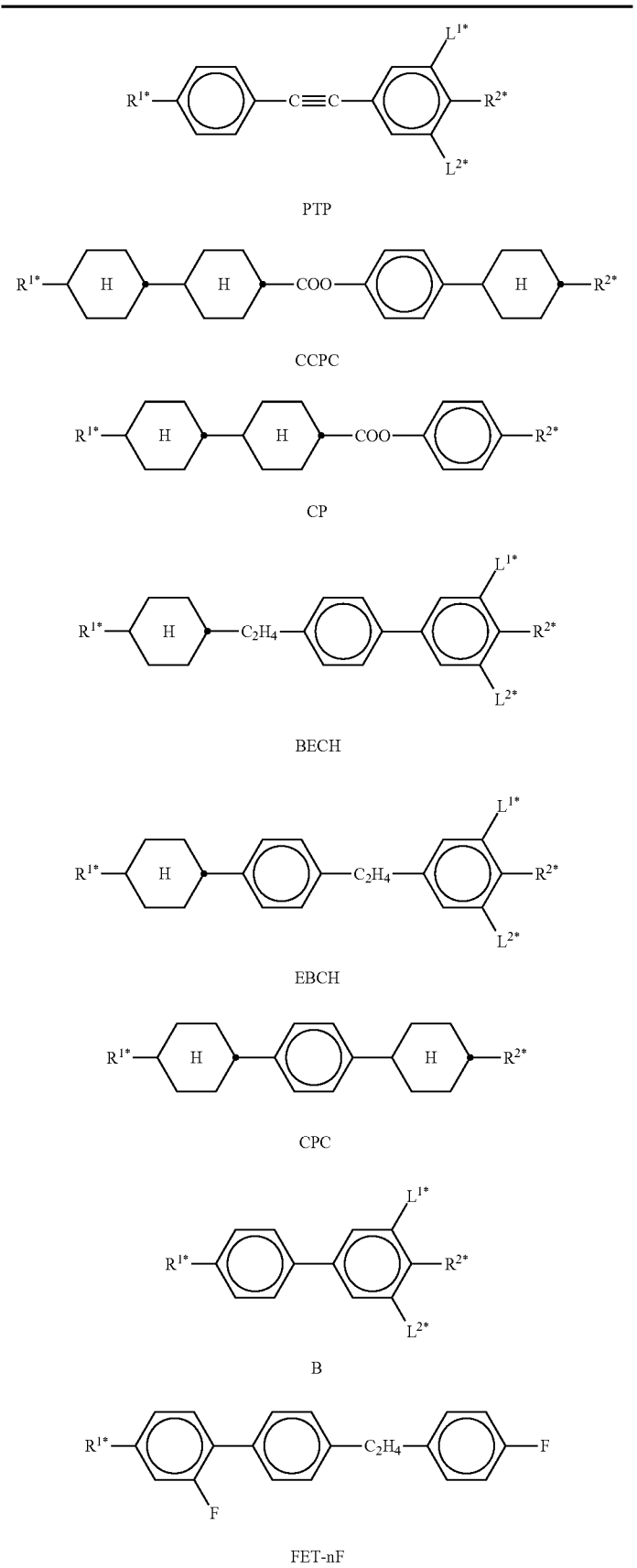

TABLE A-continued
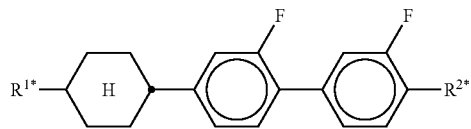
CGG
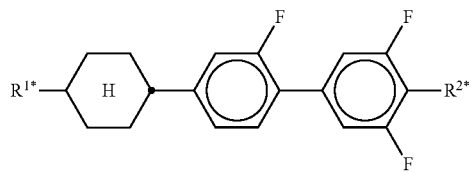
CGU
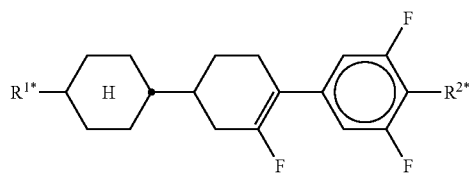
CFU
TABLE B
n, m, z preferably denote, independently of one another, 1, 2, 3, 4, 5 or 6.
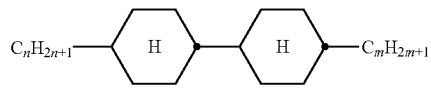
CCH-nm
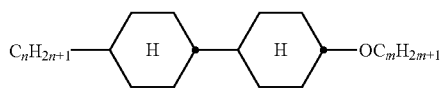
CCH-n0m
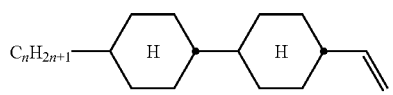
CC-n-V
CC-n-V1
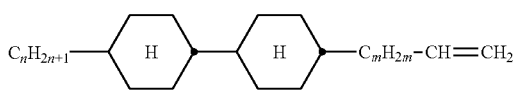
CC-n-mV TABLE B-continued
n, m, z preferably denote, independently of one another, 1, 2, 3, 4, 5 or 6.
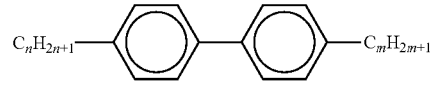
PP-n-m
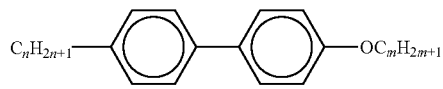
PP-n-Om
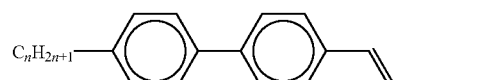
PP-n-Vm
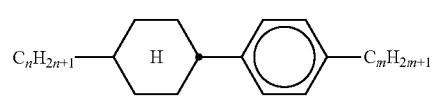
PCH-nm
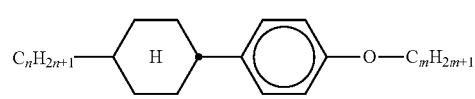
PCH-n0m
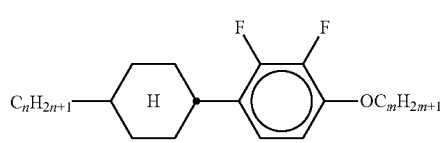
CY-n-Om
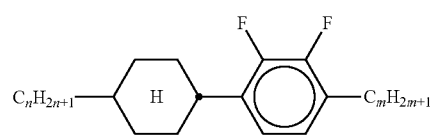
CY-n-m
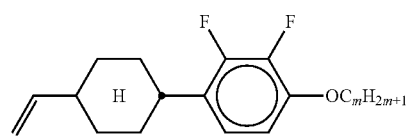
CY-V-Om TABLE B-continued
n, m, z preferably denote, independently of one another, 1, 2, 3, 4, 5 or 6.
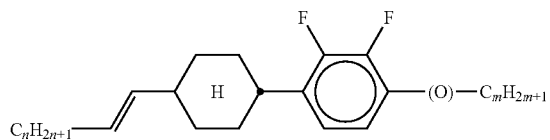
CY-nV-(O)m
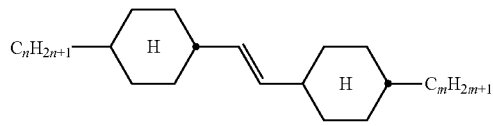
CVC-n-m
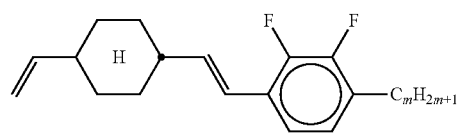
CVY-V-m
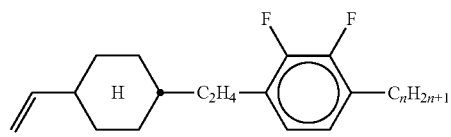
CEY-V-m
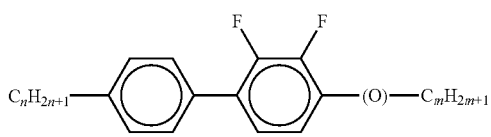
PY-n-(O)m
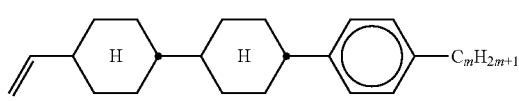
CCP-V-m
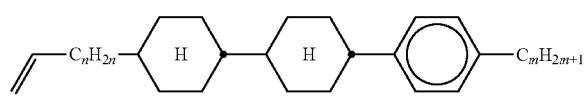
CCP-Vn-m
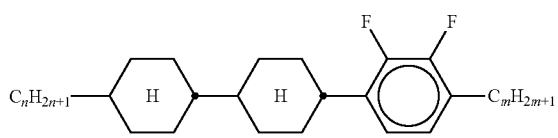
CCY-n-m TABLE B-continued
n, m, z preferably denote, independently of one another, 1, 2, 3, 4, 5 or 6.
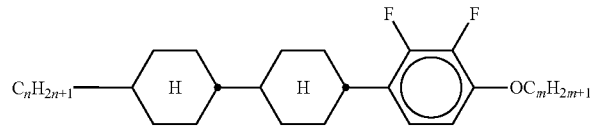
CCY-n-Om
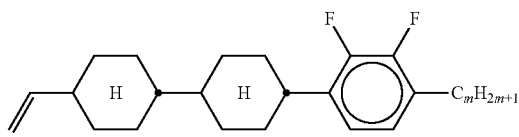
CCY-V-m
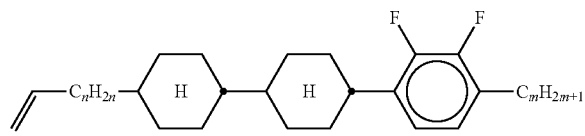
CCY-Vn-m
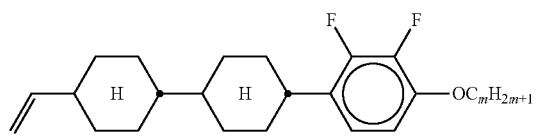
CCY-V-Om
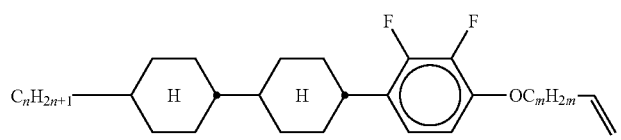
CCY-n-OmV
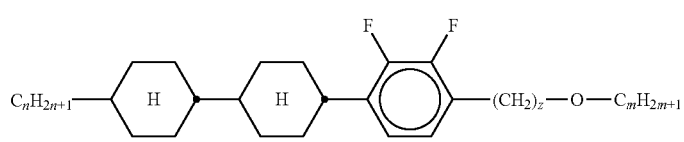
CCY-n-zOm
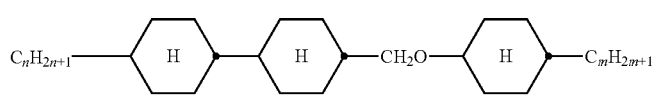
CCOC-n-m TABLE B-continued
n, m, z preferably denote, independently of one another, 1, 2, 3, 4, 5 or 6.
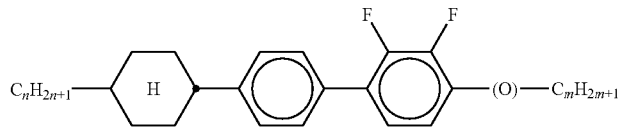
CPY-n-(O)m
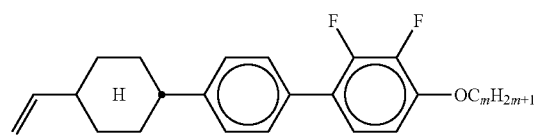
CPY-V-Om
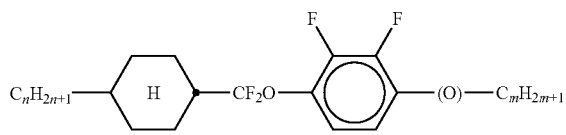
CQY-n-(O)m
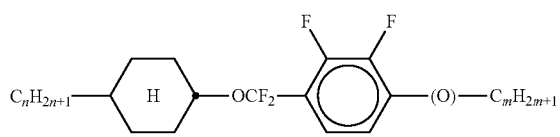
CQIY-n-(O)m
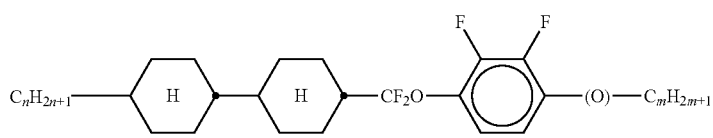
CCQY-n-(O)m
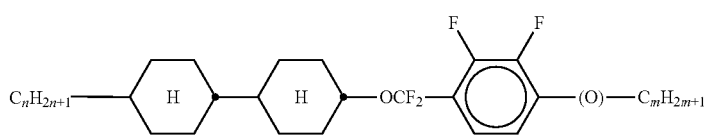
CCQIY-n-(O)m
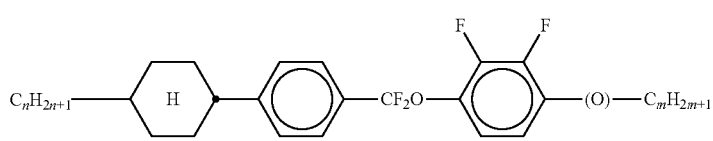
CPQY-n-(O)m TABLE B-continued
n, m, z preferably denote, independently of one another, 1, 2, 3, 4, 5 or 6.
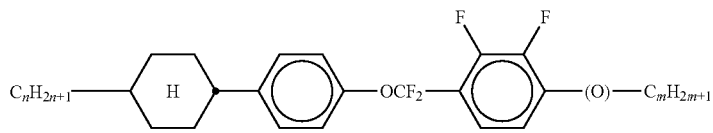
CPQIY-n-Om
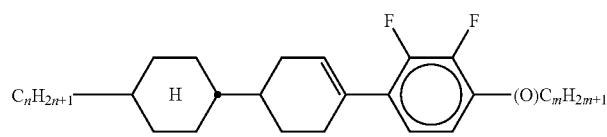
CLY-n-(O)m
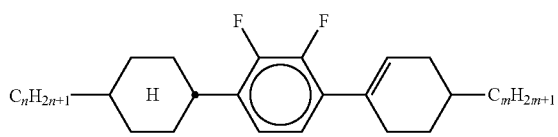
CYLI-n-m
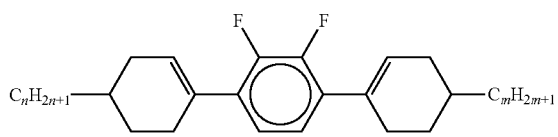
LYLI-n-m
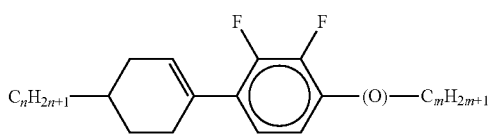
LY-n-(O)m
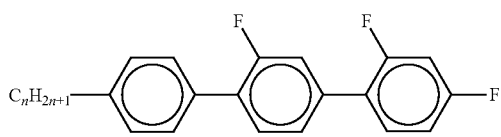
PGIGI-n-F
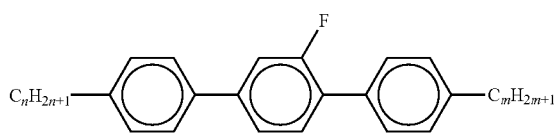
PGP-n-m TABLE B-continued
n, m, z preferably denote, independently of one another, 1, 2, 3, 4, 5 or 6.
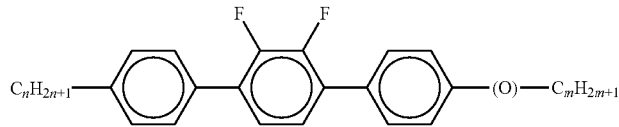
PYP-n-(O)m
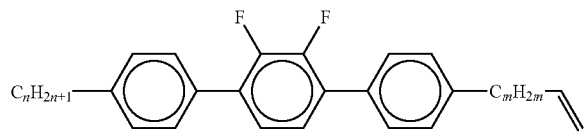
PYP-n-mV
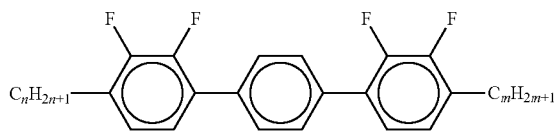
YPY-n-m
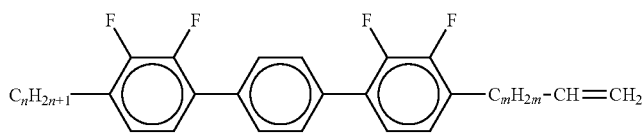
YPY-n-mV
BCH-nm
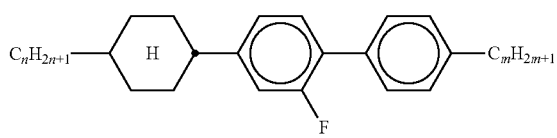
BCH-nmF
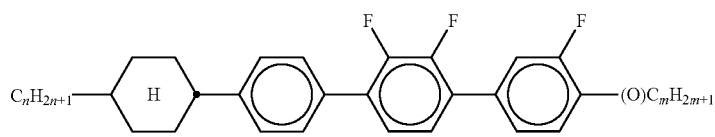
CPYP-n-(O)m TABLE B-continued
n, m, z preferably denote, independently of one another, 1, 2, 3, 4, 5 or 6.
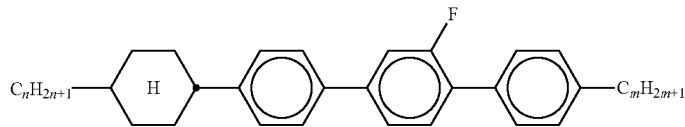
CPGP-n-m
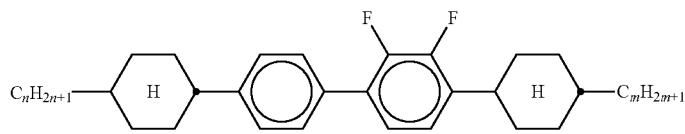
CPYC-n-m
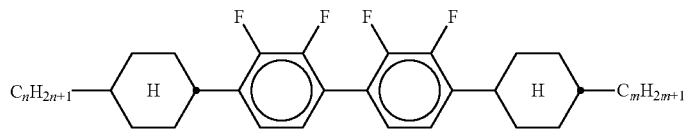
CYYC-n-m
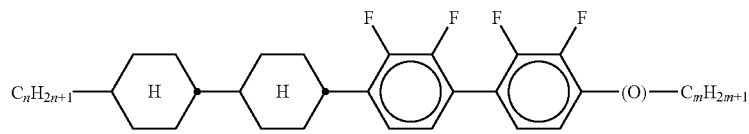
CCYY-n-m
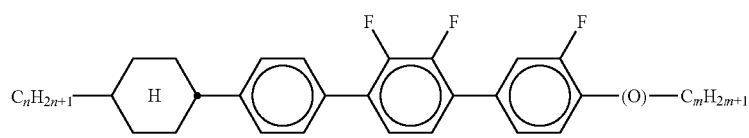
CPYG-n-(O)m
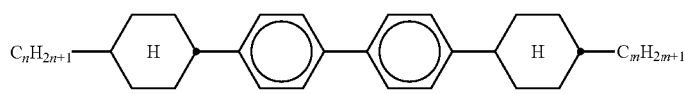
CBC-nm
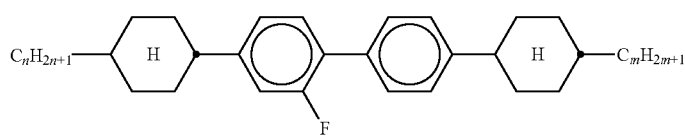
CBC-nmF TABLE B-continued
n, m, z preferably denote, independently of one another, 1, 2, 3, 4, 5 or 6.
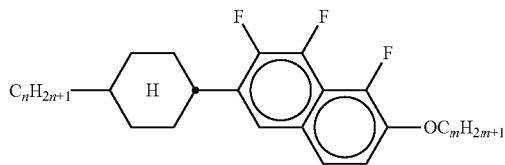
CNap-n-Om
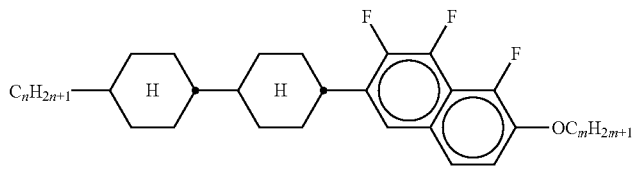
CCNap-n-Om
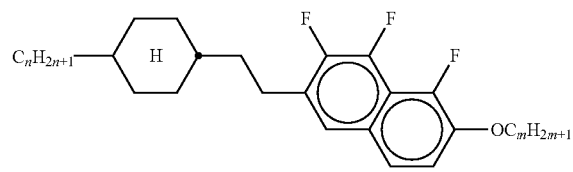
CENap-n-Om
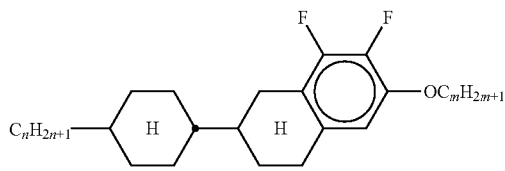
CTNap-n-Om
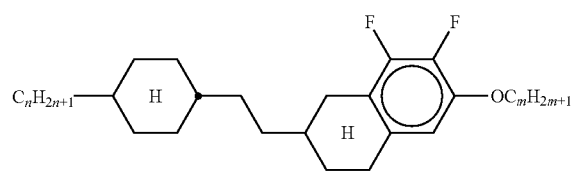
CETNap-n-Om
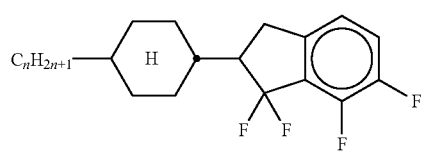
CK-n-F
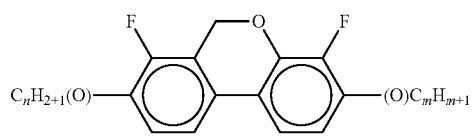
DFDBC-n(O)-(O)m TABLE B-continued
n, m, z preferably denote, independently of one another, 1, 2, 3, 4, 5 or 6.
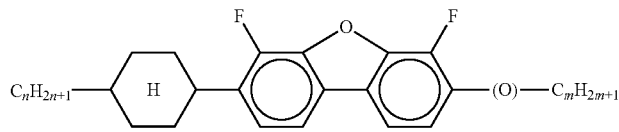
C-DFDBF-n-(O)m
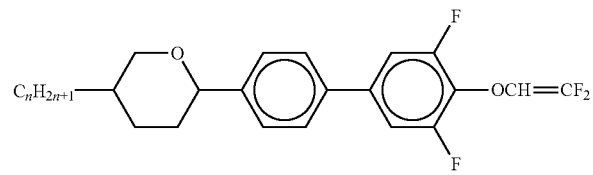
APU-n-OXF
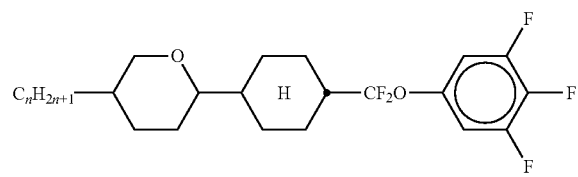
ACQU-n-F
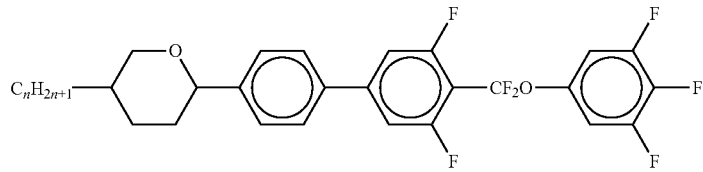
APUQU-n-F
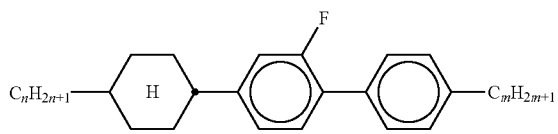
BCH-n.Fm
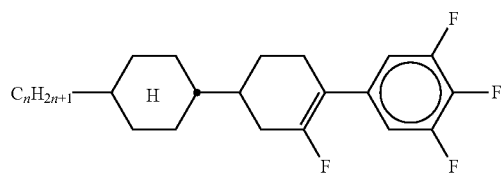
CFU-n-F
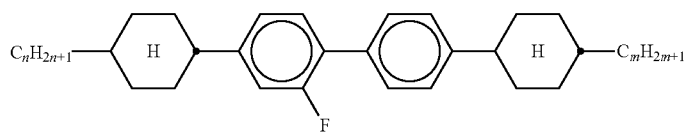
CBC-nmF TABLE B-continued
n, m, z preferably denote, independently of one another, 1, 2, 3, 4, 5 or 6.
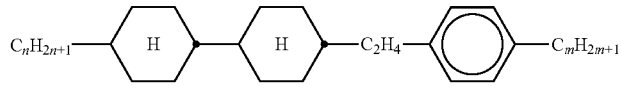
ECCP-nm
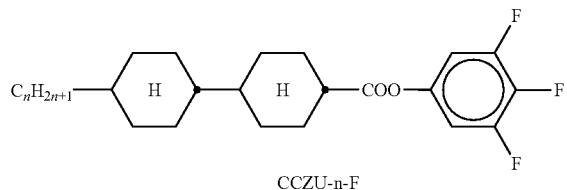
CCZU-n-F
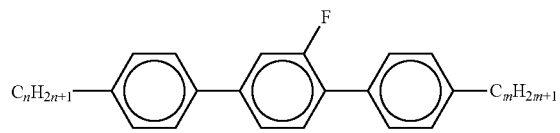
PGP-n-m
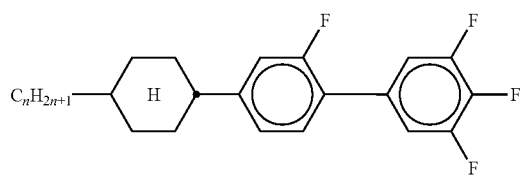
CGU-n-F
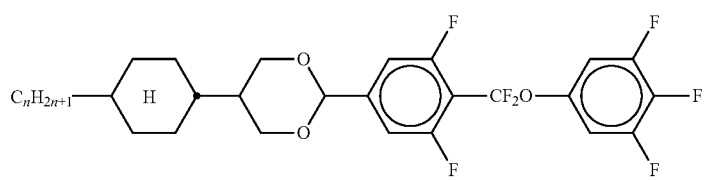
CDUQU-n-F
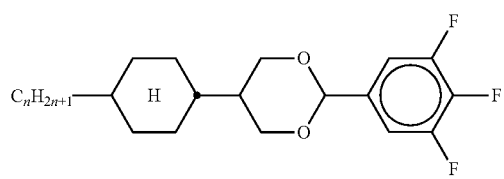
CDU-n-F
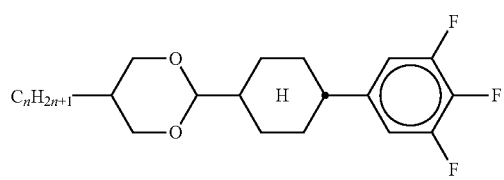
DCU-n-F TABLE B-continued
n, m, z preferably denote, independently of one another, 1, 2, 3, 4, 5 or 6.
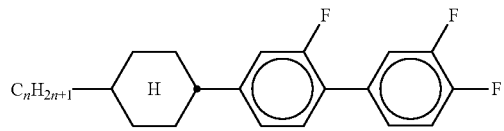
CGG-n-F
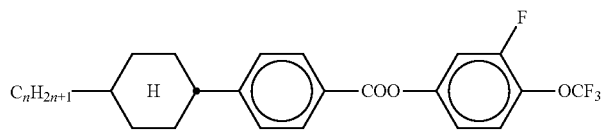
CPZG-n-OT
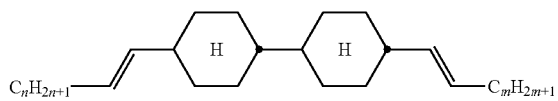
CC-nV-Vm
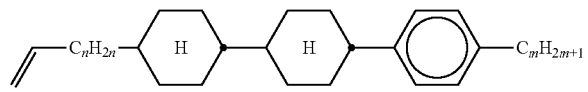
CCP-Vn-m
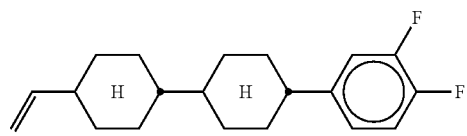
CCG-V-F
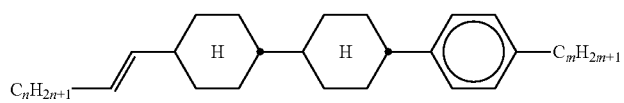
CCP-nV-m
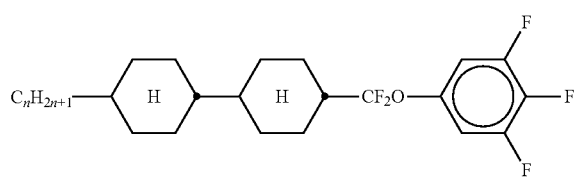
CCQU-n-F
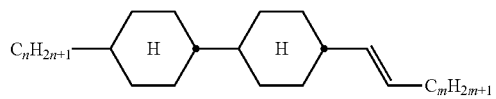
CC-n-Vm TABLE B-continued
n, m, z preferably denote, independently of one another, 1, 2, 3, 4, 5 or 6.
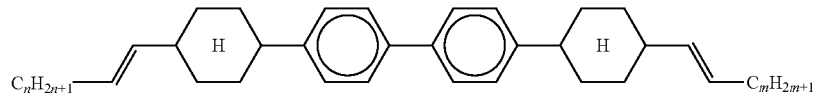
CPPC-nV-Vm
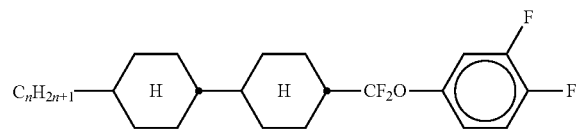
CCQG-n-F
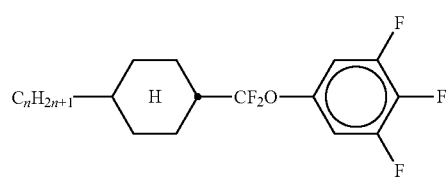
CQU-n-F
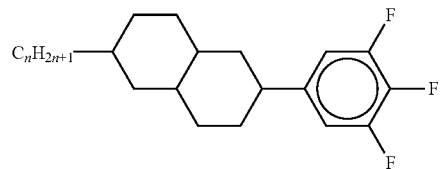
Dec-U-n-F
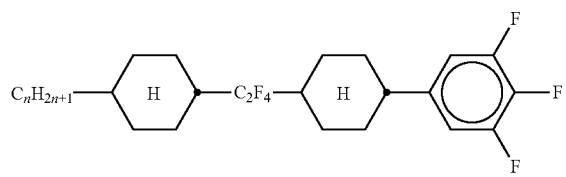
CWCU-n-F
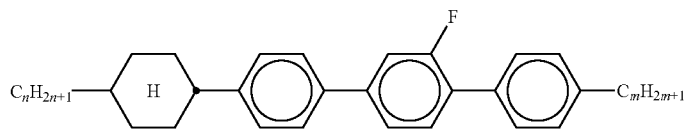
CPGP-n-m
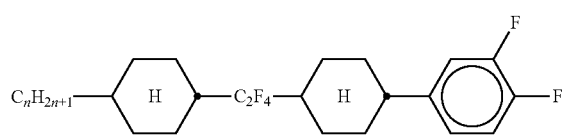
CWCG-n-F TABLE B-continued
n, m, z preferably denote, independently of one another, 1, 2, 3, 4, 5 or 6.
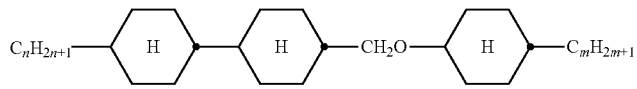
CCOC-n-m
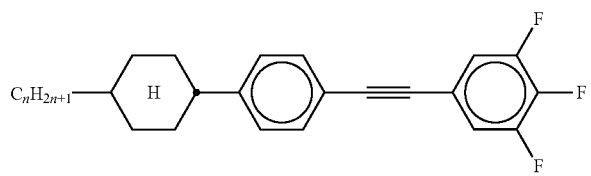
CPTU-n-F
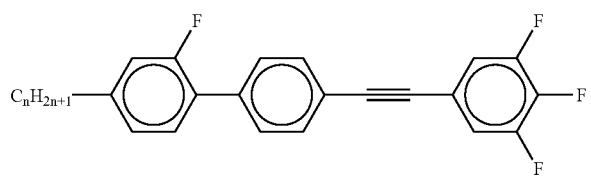
GPTU-n-F
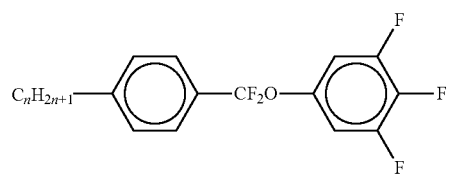
PQU-n-F
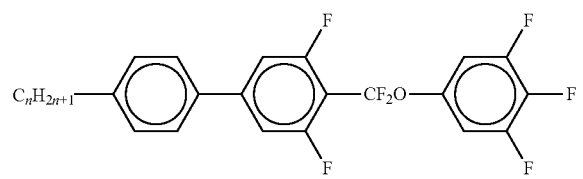
PUQU-n-F
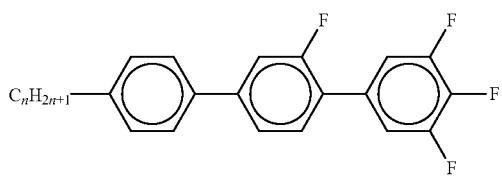
PGU-n-F
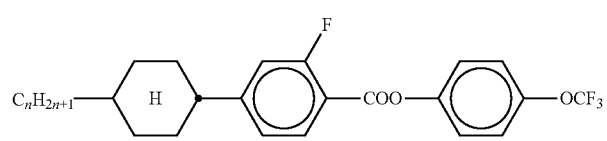
CGZP-n-OT TABLE B-continued
n, m, z preferably denote, independently of one another, 1, 2, 3, 4, 5 or 6.
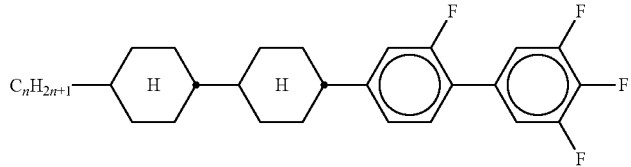
CCGU-n-F
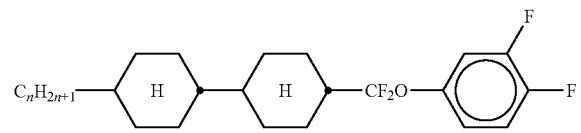
CCQG-n-F
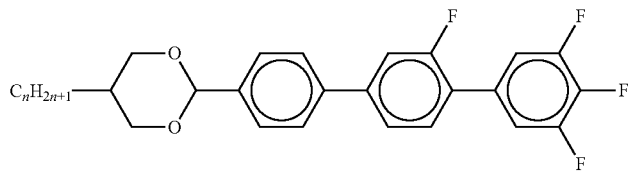
DPGU-n-F
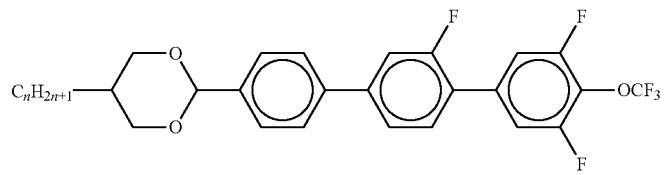
DPGU-n-OT
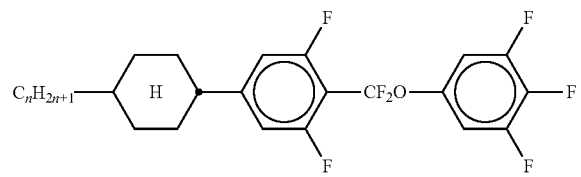
CUQU-n-F
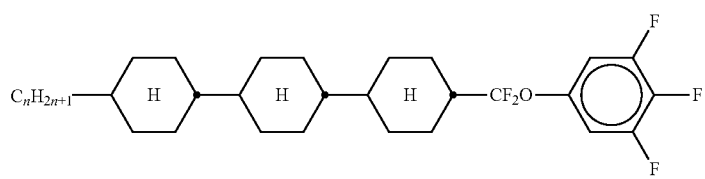
CCCQU-n-F TABLE B-continued
n, m, z preferably denote, independently of one another, 1, 2, 3, 4, 5 or 6.
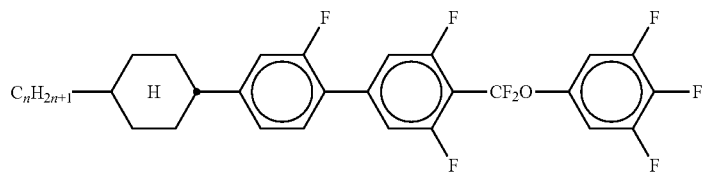
CGUQU-n-F
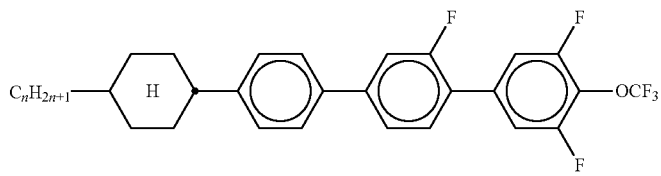
CPGU-n-OT
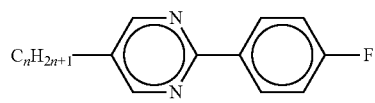
PYP-n-F
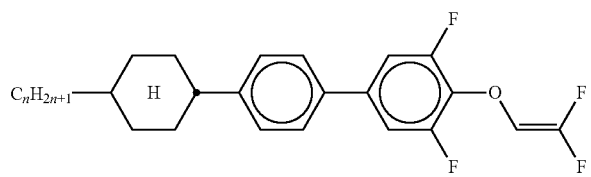
CPU-n-OXF
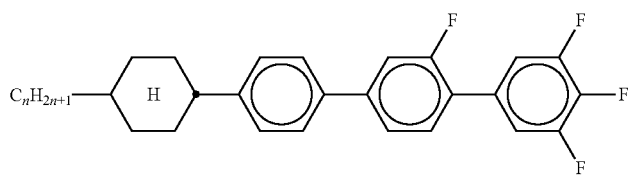
CPGU-n-F
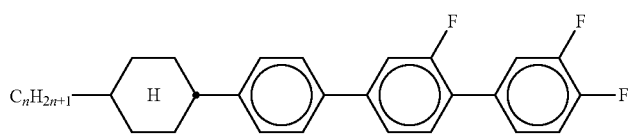
CPGG-n-F
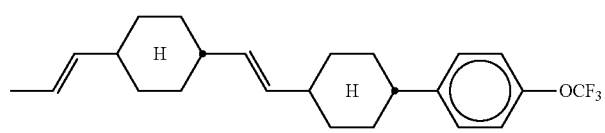
CVCP-1V-OT TABLE B-continued
n, m, z preferably denote, independently of one another, 1, 2, 3, 4, 5 or 6.
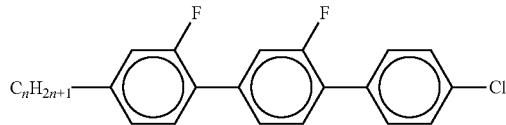
GGP-n-Cl
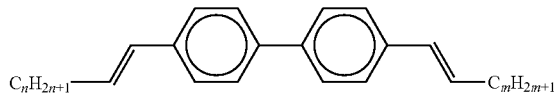
PP-nV-Vm
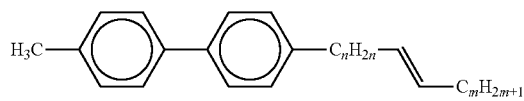
PP-1-nVm
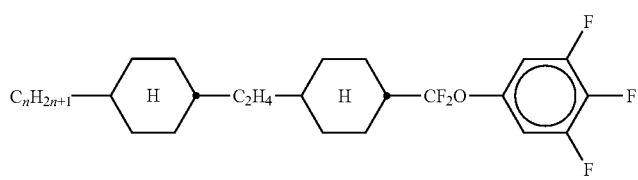
CWCQU-n-F
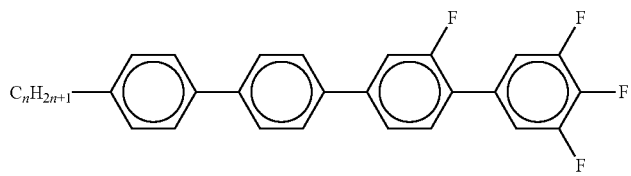
PPGU-n-F
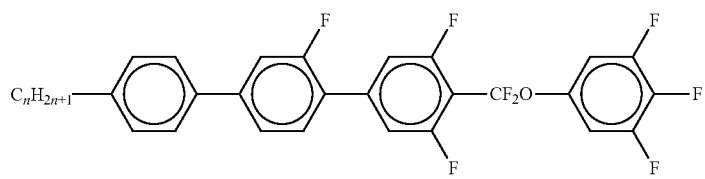
PGUQU-n-F
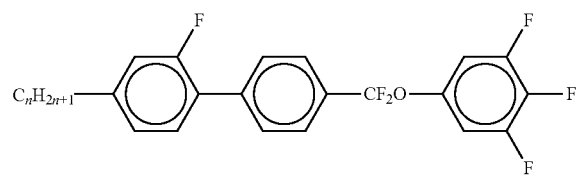
GPQU-n-F TABLE B-continued
n, m, z preferably denote, independently of one another, 1, 2, 3, 4, 5 or 6.
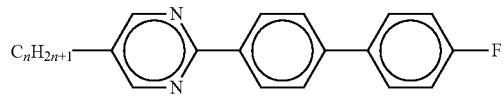
MPP-n-F
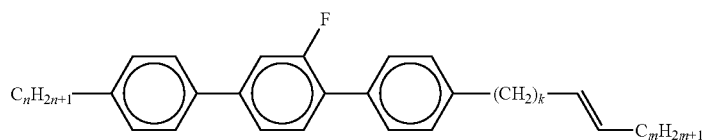
PGP-n-kVm
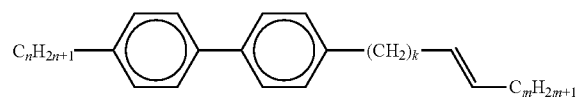
PP-n-kVm
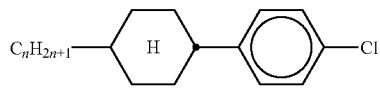
PCH-nCl
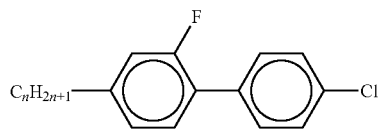
GP-n-Cl
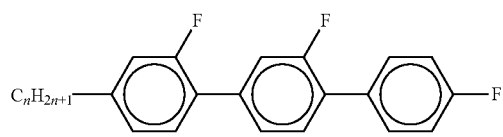
GGP-n-F
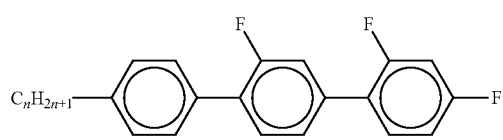
PGIGI-n-F
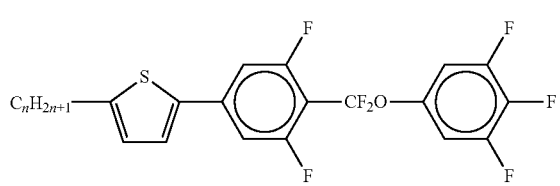
SUQU-n-F TABLE B-continued
n, m, z preferably denote, independently of one another, 1, 2, 3, 4, 5 or 6.
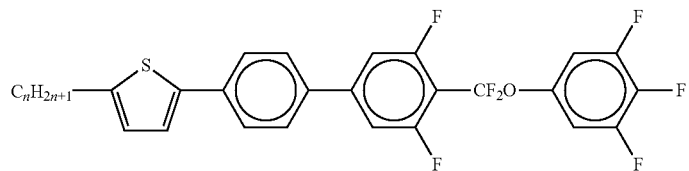
SPUQU-n-F
Table C below shows stabilisers, which are preferably employed in the liquid-crystalline media in accordance with the invention.
TABLE C
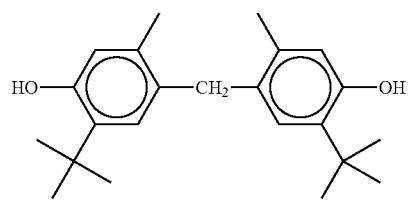
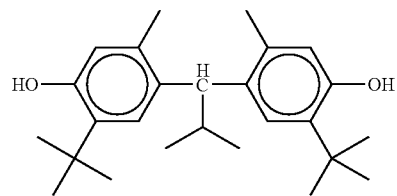
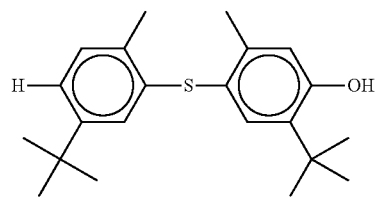
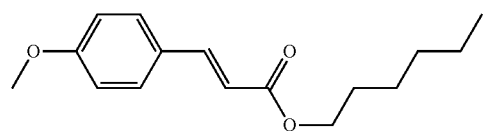 [SMILES: CCCCCCOC(=O)/C=C/c1ccc(OC)cc1]
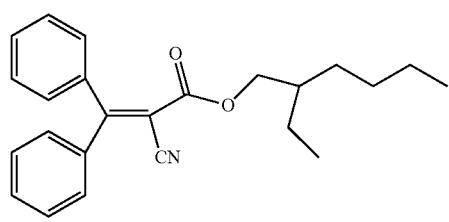 [SMILES: CCCCC(CC)COC(=O)C(C#N)=C(c1ccccc1)c1ccccc1]

TABLE C-continued
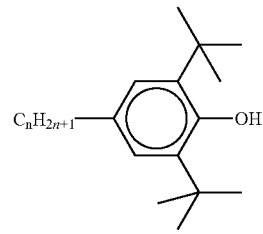
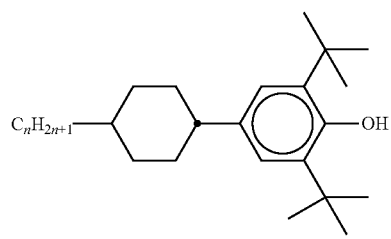
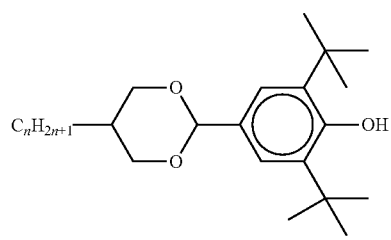
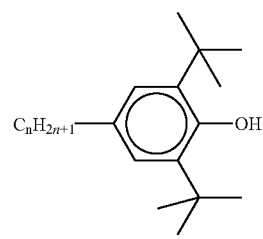
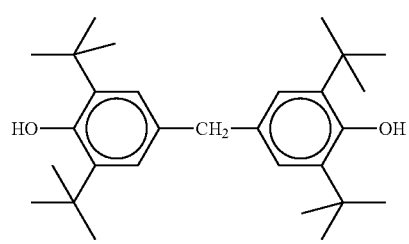
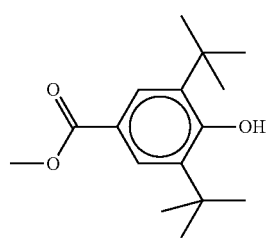

TABLE C-continued
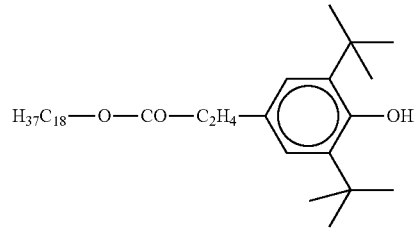
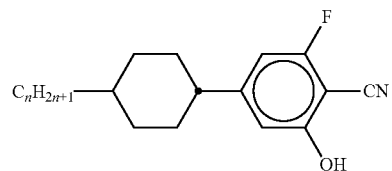
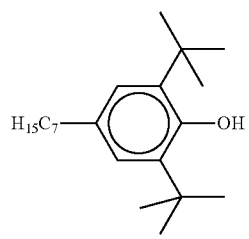
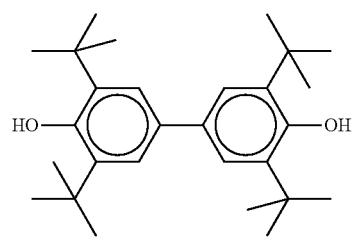
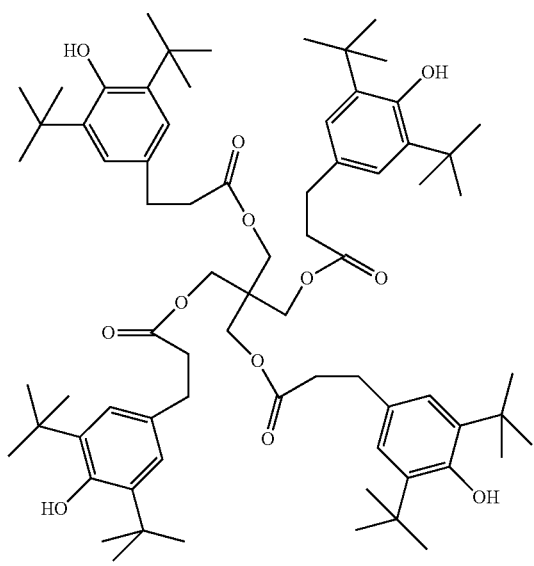 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
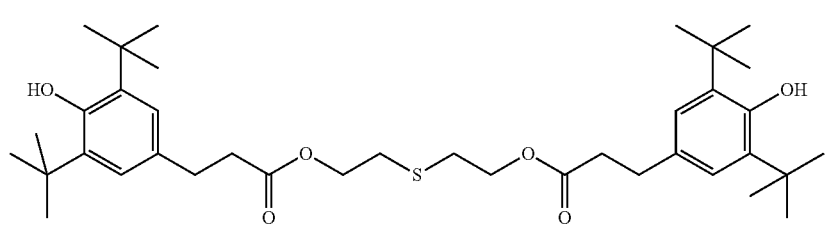 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
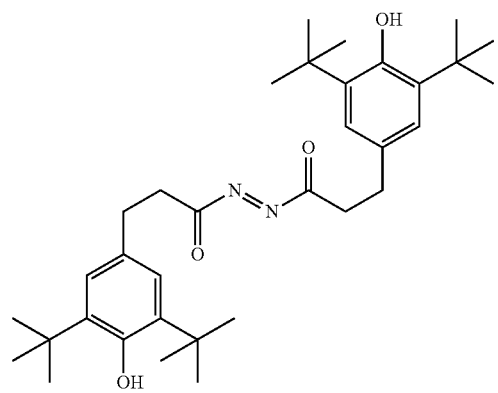 [SMILES: CC(C)(C)c1cc(CCC(=O)/N=N/C(=O)CCc2cc(C(C)(C)C)c(O)c(C(C)(C)C)c2)cc(C(C)(C)C)c1O]
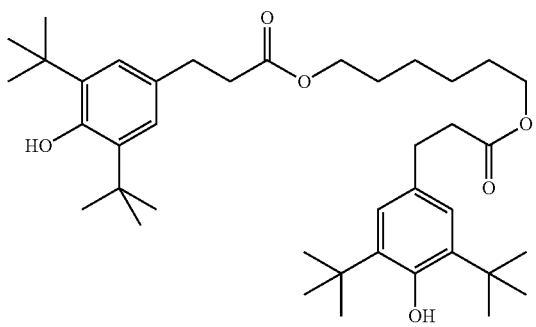 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
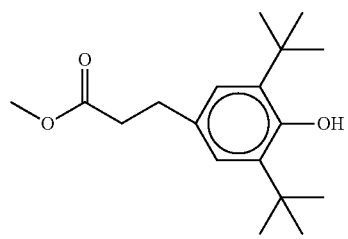
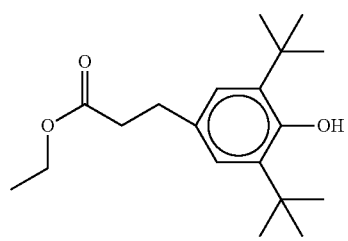

TABLE C-continued
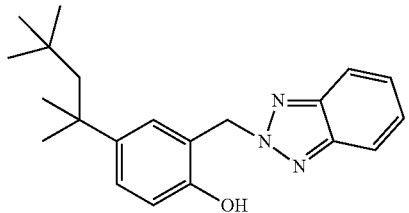 [SMILES: CC(C)(C)CC(C)(C)c1ccc(O)c(Cn2nc3ccccc3n2)c1]
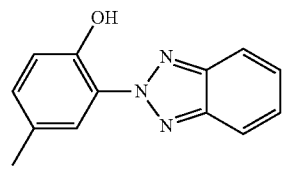 [SMILES: Cc1ccc(O)c(-n2nc3ccccc3n2)c1]
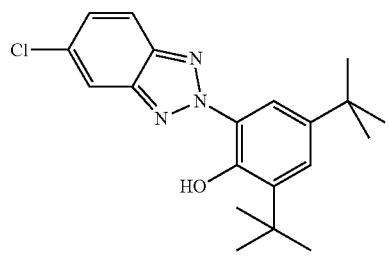 [SMILES: CC(C)(C)c1cc(-n2nc3ccc(Cl)cc3n2)c(O)c(C(C)(C)C)c1]
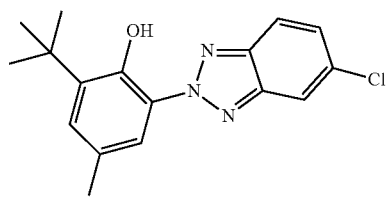 [SMILES: Cc1cc(-n2nc3ccc(Cl)cc3n2)c(O)c(C(C)(C)C)c1]
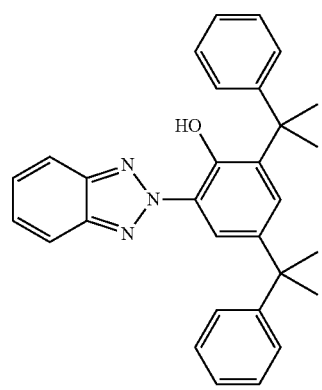 [SMILES: CC(C)(c1ccccc1)c1cc(-n2nc3ccccc3n2)c(O)c(C(C)(C)c2ccccc2)c1]
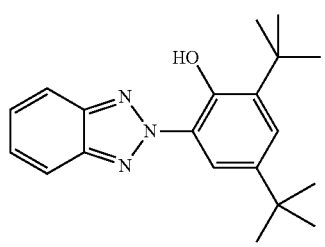 [SMILES: CC(C)(C)c1cc(-n2nc3ccccc3n2)c(O)c(C(C)(C)C)c1]

TABLE C-continued
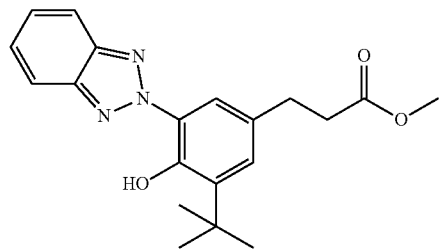 [SMILES: COC(=O)CCc1cc(-n2nc3ccccc3n2)c(O)c(C(C)(C)C)c1]
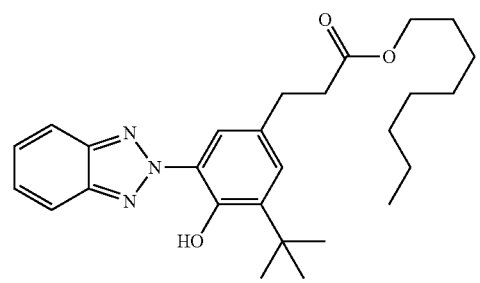 [SMILES: CCCCCCCCOC(=O)CCc1cc(-n2nc3ccccc3n2)c(O)c(C(C)(C)C)c1]
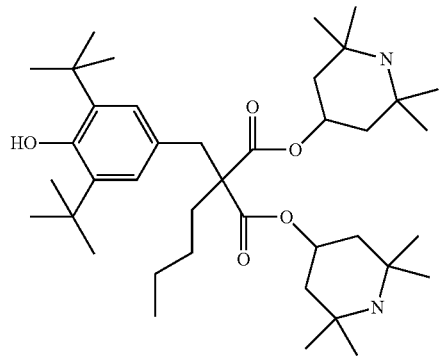 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]
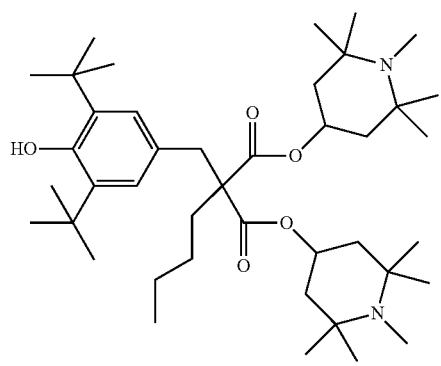 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]

TABLE C-continued
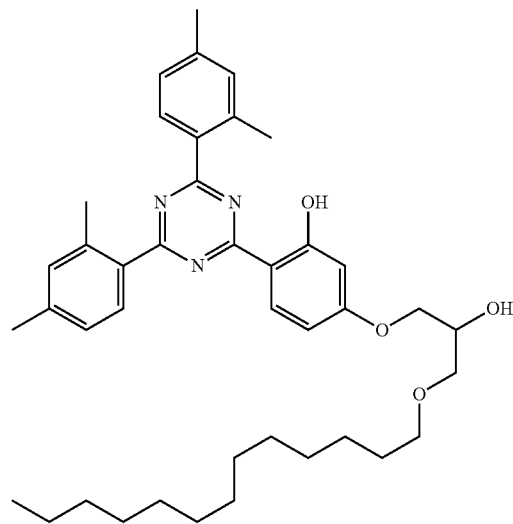 [SMILES: CCCCCCCCCCCCCOCC(O)COc1ccc(-c2nc(-c3ccc(C)cc3C)nc(-c3ccc(C)cc3C)n2)c(O)c1]
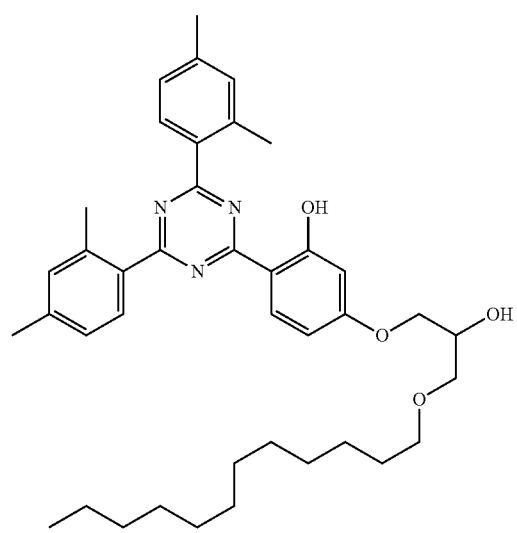 [SMILES: CCCCCCCCCCCCOCC(O)COc1ccc(-c2nc(-c3ccc(C)cc3C)nc(-c3ccc(C)cc3C)n2)c(O)c1]
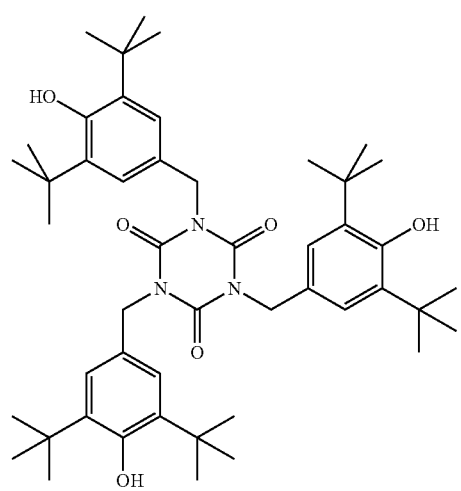 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
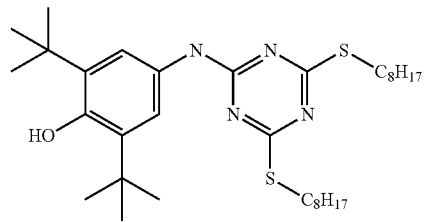
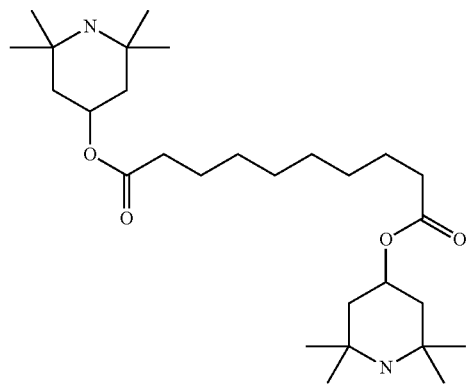
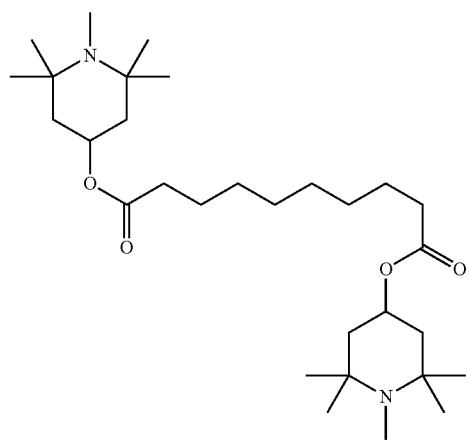
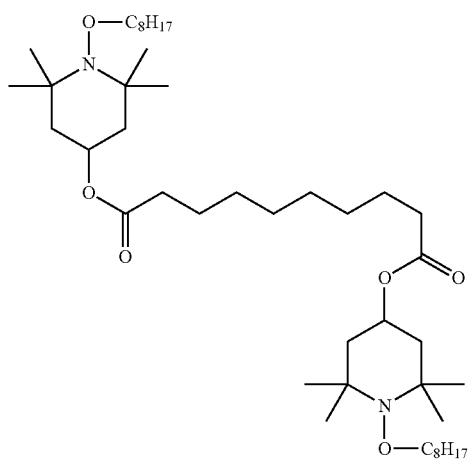

TABLE C-continued
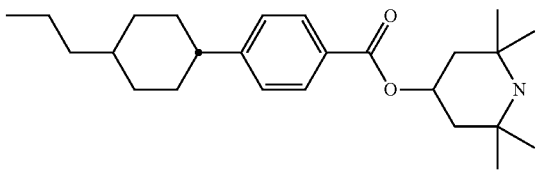
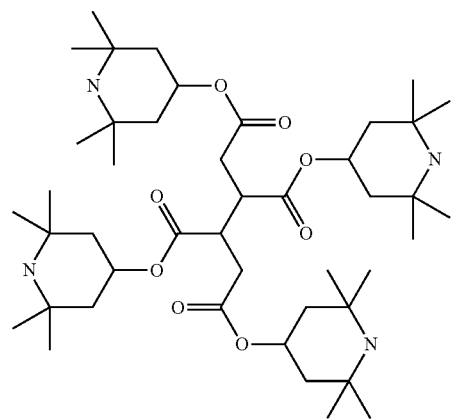
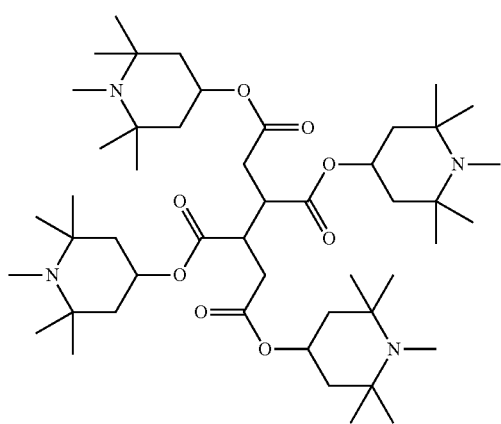
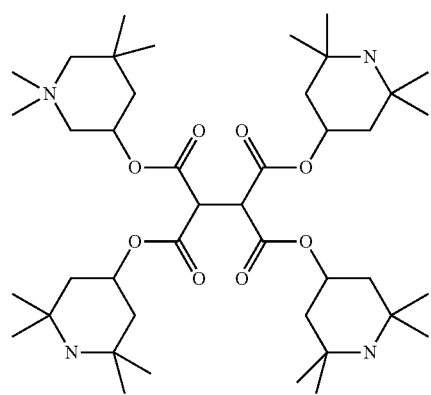

TABLE C-continued

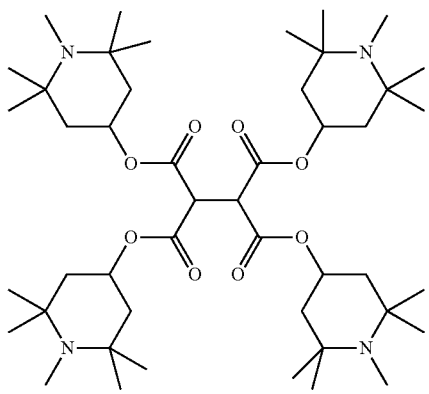

Note:
n in this table stands for an integer from 1 to 12.

Unless indicated otherwise, all concentrations in the present application are indicated in percent by weight and are based on the corresponding mixture as a whole, comprising all solid or liquid-crystalline components, without solvents.

The following abbreviations and symbols are used:
Δn optical anisotropy at 20° C. and 589 nm,
Δε dielectric anisotropy at 20° C. and 1 kHz,
cl.p., T(N,I) clearing point [° C.].

The following examples explain the present invention without it being intended for a restriction in the subject matter of the invention to be derived therefrom.

EXAMPLES

1) General Procedure for the Production of the Devices According to the Invention The liquid-crystalline medium (composition varies in accordance with the examples below) is introduced into an electro-optical cell having a thickness of about 4 μm. The substrate material of the cells varies in accordance with the examples below (ITO, glass or its combination). The cells are provided with 2 linear polarisers with parallel alignment of the planes of polarisation on the front and back of the cells. Finally, temperature-dependent measurements of the light transmission of the cells are carried out.

2) Examples of Liquid-Crystalline Media Used

| Entry | Mixture No. | | Compounds No. | Amount of added Compound [in %] |
|---|---|---|---|---|
| 1 | A | + | i | 2.00 |
| 2 | B | + | i | 2.00 |
| 3 | A | + | ii | 2.00 |

Compounds of Formula I Used:

i

-continued

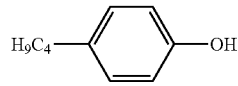

ii

Liquid-Crystalline Mixtures Used:

| Mixture A T(N, I) = 80° C. | | Mixture B T(N,I) = 77° C. | |
|---|---|---|---|
| Δn = 0.0901 | Δε = −3.3 | Δn = 0.1126 | Δε = 19.2 |
| Compound | Proportion (%) | Compound | Proportion (%) |
| CCH-501 | 9 | CY-3-O4 | 14 |
| CCH-35 | 14 | CCY-3-O2 | 9 |
| PCH-53 | 8 | CCY-3-O3 | 9 |
| CY-3-O4 | 14 | CPY-2-O2 | 10 |
| CY-5-O4 | 13 | CPY-3-O2 | 10 |
| CCY-3-O2 | 8 | CCY-3-1 | 8 |
| CCY-5-O2 | 8 | CCH-34 | 9 |
| CCY-2-1 | 9 | CCH-35 | 6 |
| CCY-3-1 | 9 | PCH-53 | 10 |
| CPY-2-O2 | 8 | CCH-301 | 6 |

3) Examples of Devices According to the Invention and their Switching Range

The table below shows the results of combinations of media 1 to 13 with the different substrate materials ITO and glass in the devices according to the invention. For each device, the switching window, i.e. the range between boundary states A and B, is indicated in degrees Celsius.

| | Substrate material | | |
|---|---|---|---|
| Entry | ITO-ITO | ITO-Glass | Glass-Glass |
| 1 | 50°->$T_{NI}$ | 63°->$T_{NI}$ | |
| 2 | 45°->$T_{NI}$ | 45°-63° | 48°-60° |
| 3 | −10°-8° | 15°-50° | |

4) Switching Process of the Devices According to the Invention

The devices according to the invention show a regular, gradual change in the transmission with temperature throughout their switching range ("switching window").

BRIEF DESCRIPTION OF THE DRAWINGS

FIG. 1 shows by way of example the switching process of a device containing medium according to entry 2 and the substrate material combination Glass/Glass.

It can be seen that a gradual transition from high to low transmission with increasing temperature takes place within a working range of about 48° to about 60° C. for the device according to the invention.

Figure 1:
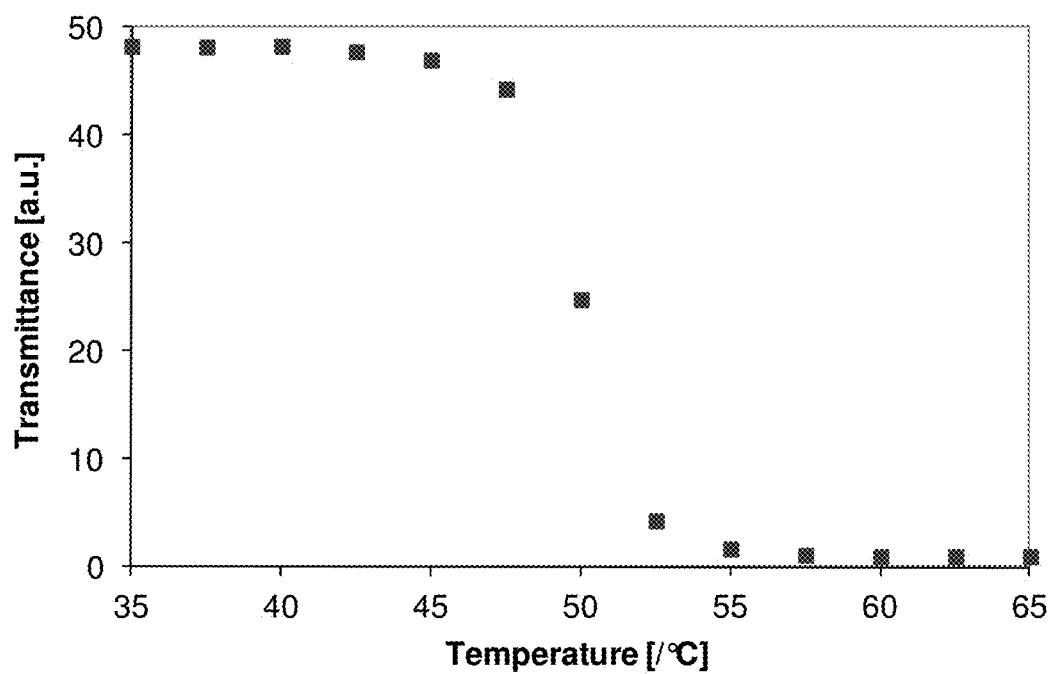
FIG. 1 is a graph of transmittance vs. temperature for entry 2.
Figure 2:
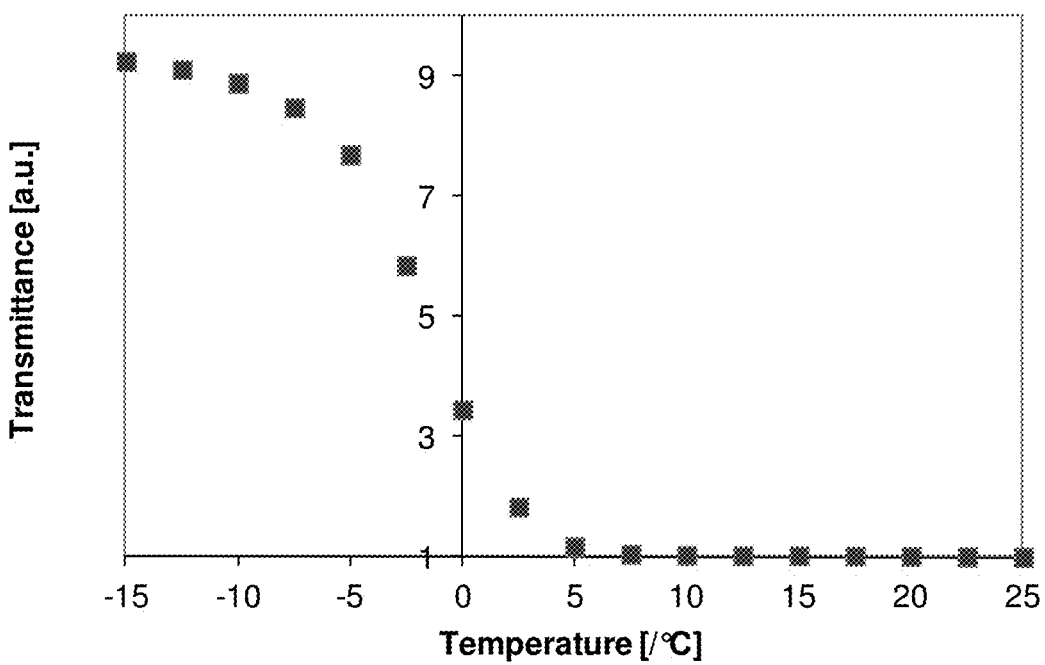
FIG. 2 is a graph of transmittance vs. temperature for entry 3.

Furthermore, FIG. 2 shows the switching process of a cell containing medium according to entry 3 and the substrate material combination of ITO/ITO.

It can be seen that a gradual transition from high to low transmission with increasing temperature takes place within a working range from about −10° to about 8° C. for the device according to the invention.

The invention claimed is:

1. A window
which comprises a temperature-reactive device suitable for regulation of light transmission, which has
A) a boundary state A with a transmission $T_A$ at a temperature below a boundary temperature $\theta_A$ and
B) a boundary state B with a transmission $T_B$ at a temperature above a boundary temperature $\theta_B$, whereby: $\theta_A < \theta_B$ and $T_A > T_B$, and comprises a layer of a liquid-crystalline medium, characterized in that the liquid-crystalline medium comprises at least one liquid-crystalline compound and at least one compound of formula I, $$R^{11}\text{-}A^{11}\text{-}(Z^{12}\text{-}A^{12})_m\text{-}AG \qquad (I),$$

in which,
$A^{11}$ and $A^{12}$ each, independently of one another, denote an aryl-, heteroaryl-, heterocyclic- or alicyclic group optionally being substituted by one or more identical or different groups L,
L in each case, independently of one another, denotes, halogen, —CN, —NO$_2$, —NCO, —NCS, —OCN, —SCN, straight-chain or branched alkyl or alkoxy having 1 to 5 C atoms, where, in addition, one or more non-terminal CH$_2$ groups in these radicals may each be replaced, independently of one another, by

—C≡C—, —CF$_2$O—, —CH=CH—,

, —O—,

—CO—O—, —O—CO—, in such a way that O atoms are not linked directly to one another, and in which, in addition, one or more H atoms may be replaced by halogen,
$Z^{12}$ in each case, independently of one another, denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$—, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^{01}$=CY$^{02}$—, —C≡C—, —CH=CH—COO—, —OCO—CH=CH—, or a single bond,
$Y^{01}$ and $Y^{02}$ each, independently of one another, denote H, F, Cl or CN,
$R^0$ and $R^{00}$ each, independently of one another, denote H or alkyl having 1 to 12 C atoms,
$R^{11}$ each, independently of one another, denote an alkyl or alkoxy radical having 1 to 15 C atoms, where, in addition, one or more non-terminal CH$_2$ groups in these radicals may each be replaced, independently of one another, by —C≡C—, —CF$_2$O—, —CH=CH—, 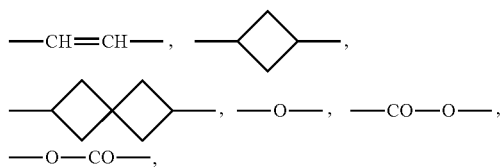

, —O—, —CO—O—,

—O—CO—, in such a way that O atoms are not linked directly to one another, and in which, in addition, one or more H atoms may be replaced by halogen,
AG denotes -Sp-X$^{11}$
Sp denotes —(CH$_2$)$_p$—,
p denotes 0, 1 or 2,
X$^{11}$ denotes a group —NH$_2$, —SH, —OH, —(CO)OH or a group of the formulae

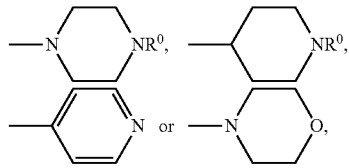

and
m denotes 0, 1 or 2,
wherein the device comprises no alignment layers adjacent to the layer of the liquid-crystalline medium.

2. A window according to claim 1, wherein anchor group AG in formula I denotes —NH$_2$, —SH, —OH or —(CO)OH.

3. A window according to claim 1, wherein m in formula I denotes 0.

4. A window according to claim 1, wherein the layer of the liquid-crystalline medium is arranged between two substrate layers.

5. A window according to claim 1, wherein the total concentration of compounds of formula I ranges from 0.01 to 10% by weight regarding the liquid-crystalline medium as a whole.

6. A window according to claim 1, which has two or more polarisers, at least one of which is arranged on one side of the layer of the liquid-crystalline medium and at least one of which is arranged on the opposite side of the layer of the liquid-crystalline medium.

7. A window according to claim 1, characterised in that transition between the two boundary states A and B with increasing temperature and the transition between the two boundary states B and A with decreasing temperature proceeds gradually via intermediate values of the transmission T.

8. A window according to claim 1, characterized in that one or more liquid crystalline compounds in the layer of the liquid crystalline medium in the boundary state A are homeotropically aligned.

9. A method comprising regulating light transmission with a window according to claim 1 for the regulation of light entry and/or energy input into an interior.

10. Process for production of the device within a window according to claim 1, comprising at least a step of providing a layer of liquid-crystalline medium, comprising at least one liquid-crystalline compound and at least one compound of formula I, onto a substrate.

11. Process for temperature-dependent control of light transmission through the device within a window according to claim 1, comprising a layer of a liquid-crystalline medium comprising at least one liquid-crystalline compound and at least one compound of formula I, wherein at least one liquid-crystalline compound of the liquid-crystalline medium changes from a homeotropic alignment to a planar alignment as a function of temperature.

12. A window which comprises a temperature-reactive device suitable for regulation of light transmission, which has
A) a boundary state A with a transmission $T_A$ at a temperature below a boundary temperature $\theta_A$ and
B) a boundary state B with a transmission $T_B$ at a temperature above a boundary temperature $\theta_B$, whereby: $\theta_A < \theta_B$ and $T_A > T_B$,
and comprises a layer of a liquid-crystalline medium, characterized in that the liquid-crystalline medium comprises at least one liquid-crystalline compound and at least one compound of formula I, $$R^{11}\text{-}A^{11}\text{-}(Z^{12}\text{-}A^{12})_m\text{-}AG \qquad (I),$$

in which,
$A^{11}$ and $A^{12}$ each, independently of one another, denote an aryl-, heteroaryl-, heterocyclic- or alicyclic group optionally being substituted by one or more identical or different groups L,
L in each case, independently of one another, denotes, halogen, —CN, —NO$_2$, —NCO, —NCS, —OCN, —SCN, straight-chain or branched alkyl or alkoxy having 1 to 5 C atoms, where, in addition, one or more non-terminal CH$_2$ groups in these radicals may each be replaced, independently of one another, by —C≡C—, —CF$_2$O—,

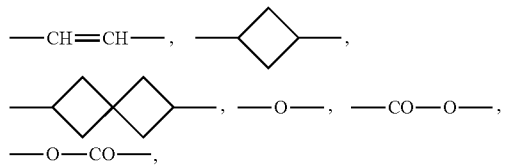

in such a way that O atoms are not linked directly to one another, and in which, in addition, one or more H atoms may be replaced by halogen,
$Z^{12}$ in each case, independently of one another, denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$—, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^{01}$=CY$^{02}$—, —C≡C—, —CH=CH—COO—, —OCO—CH=CH—, or a single bond,
$Y^{01}$ and $Y^{02}$ each, independently of one another, denote H, F, Cl or CN,
$R^0$ and $R^{00}$ each, independently of one another, denote H or alkyl having 1 to 12 C atoms,
$R^{11}$ each, independently of one another, denote an alkyl or alkoxy radical having 1 to 15 C atoms, where, in addition, one or more non-terminal CH$_2$ groups in these radicals may each be replaced, independently of one another, by —C≡C—, —CF$_2$O—,

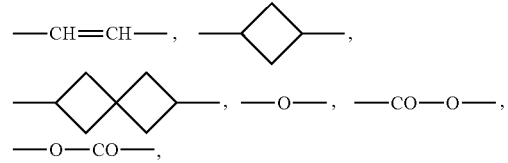

in such a way that O atoms are not linked directly to one another, and in which, in addition, one or more H atoms may be replaced by halogen,
AG denotes -Sp-X$^{11}$
Sp denotes —(CH$_2$)$_p$—,
p denotes 0, 1 or 2,
X$^{11}$ denotes a group —NH$_2$, —SH, —OH, —(CO)OH or a group of the formulae

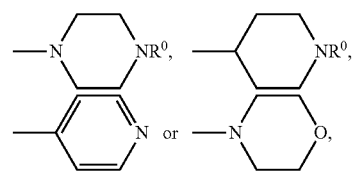

and
m denotes 0, 1 or 2,
wherein the liquid-crystalline medium is arranged directly adjacent to both substrate layers.

13. A window according to claim 12, wherein anchor group AG in formula I denotes —NH$_2$, —SH, —-OH or —(CO)OH.

14. A window according to claim 12, wherein m in formula I denotes 0.

15. A window according to claim 12, wherein the layer of the liquid-crystalline medium is arranged between two substrate layers.

16. A window according to claim 12, wherein the total concentration of compounds of formula I ranges from 0.01 to 10% by weight regarding the liquid-crystalline medium as a whole.

17. A method comprising regulating light transmission with a window according to claim 12 for the regulation of light entry and/or energy input into an interior.

18. A window according to claim 12, characterized in that one or more liquid crystalline compounds in the layer of the liquid crystalline medium in the boundary state A are homeotropically aligned.

19. Process for production of the device within a window according to claim 12, comprising at least a step of providing a layer of liquid-crystalline medium, comprising at least one liquid-crystalline compound and at least one compound of formula I, onto a substrate.

20. Process for temperature-dependent control of light transmission through the device within a window according to claim 12, comprising a layer of a liquid-crystalline medium comprising at least one liquid-crystalline compound and at least one compound of formula I, wherein at least one liquid-crystalline compound of the liquid-crystalline medium changes from a homeotropic alignment to a planar alignment as a function of temperature.

* * * * *